US008238864B2

(12) United States Patent
Kawabe et al.

(10) Patent No.: US 8,238,864 B2
(45) Date of Patent: *Aug. 7, 2012

(54) SEMICONDUCTOR INTEGRATED CIRCUIT

(75) Inventors: Manabu Kawabe, Hachioji (JP);
Satoshi Tanaka, Kokubunji (JP);
Yoshikazu Nara, Yokohama (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/188,487

(22) Filed: Jul. 22, 2011

(65) Prior Publication Data
US 2011/0275340 A1    Nov. 10, 2011

Related U.S. Application Data

(63) Continuation of application No. 12/192,355, filed on Aug. 15, 2008, now Pat. No. 7,995,982.

(30) Foreign Application Priority Data

Aug. 20, 2007    (JP) .................................. 2007-213564

(51) Int. Cl.
*H04B 1/10* (2006.01)

(52) U.S. Cl. ............... 455/296; 455/67.13; 455/252.1; 455/63.1; 375/346; 375/322

(58) Field of Classification Search .......... 455/296, 455/67.13, 252.1, 63.1; 375/346, 322
See application file for complete search history.

(56) References Cited

U.S. PATENT DOCUMENTS

| 6,760,577 | B2 * | 7/2004 | Li ............................... 455/323 |
| 7,346,325 | B2 * | 3/2008 | Maeda et al. ................. 455/296 |
| 2006/0234668 | A1 * | 10/2006 | Uchitomi et al. ............. 455/333 |
| 2008/0113625 | A1 * | 5/2008 | Maeda et al. ............. 455/67.14 |

FOREIGN PATENT DOCUMENTS

| JP | 2005-86441 A | 3/2005 |
| JP | 2006-101388 A | 4/2006 |
| JP | 2006-287900 A | 10/2006 |
| JP | 2008-124965 A | 5/2008 |

OTHER PUBLICATIONS

Teresa Meng et al, "Design and Implementation of an All-CMOS 802.11a Wireless LAN Chipset", IEEE Communications Magazine, Aug. 2003, pp. 160-168.

(Continued)

*Primary Examiner* — April G Gonzales
(74) *Attorney, Agent, or Firm* — Miles & Stockbridge P.C.

(57) ABSTRACT

The present invention aims to efficiently calibrate the characteristics of a pair of reception or transmission low-pass filters by a receiving or transmitting circuit. A semiconductor integrated circuit includes an RF receiver that processes an RF reception signal, an RF transmitter that generates an RF transmission signal and a frequency synthesizer. A reception low-pass filter of the RF receiver suppresses undesired components contained in I and Q baseband reception signals. A transmission low-pass filter of the RF transmitter suppresses noise due to D/A conversion, which is contained in I and Q transmission analog baseband signals. A calibration test signal is supplied to the inputs of the pair of reception or transmission low-pass filters. A difference in phase between the pair of filters is detected by a phase detection unit. A calibration controller calibrates a relative mismatch between the cut-off frequencies of the pair of filters.

20 Claims, 5 Drawing Sheets

OTHER PUBLICATIONS

Masoud Zargari et al., "Challenges in the Design of CMOS Transceivers for the IEEE 802.11 Wireless LANs: Past, Present and Future", IEEE Radio Frequency Integrated Circuits Symposium, 2005, pp. 353-356.

Garcia et al., "Fully-Integrated WCDMA Direct Conversion SiGeC BiCMOS Receiver", Bipolar/BiCMOS Circuits and Technology, Sep. 14, 2004, pp. 116-119.

Hsieh et al.,"An Auto-I/Q Calibrated CMOS Transceiver for 802.11g", IEEE Journal of Solid-State Circuits, Nov. 2005, vol. 40, No. 11, pp. 2187-2192.

Office Action issued Dec. 22, 2011, in Japanese Application No. 2007-213564.

Hideyuki Kokatsu et al., "1.9 GHz Synthesizer for Direct Conversion", 1995 Proceedings #1, Communication Society Conference of IEICE, Aug. 15, 1995, pp. 196, B-196.

Kazumi Satou et al., "The Trend of Standardization for High Throughput Wireless LAN with MIMO Techniques—the trend of Standardization concerning IEEE 802.11n", 2005 Proceedings #1, Electronics Society Conference of IEICE, Sep. 7, 2005, pp. S-57, S-58 and CS-7-4.

Office Action issued Oct. 13, 2011 in Japanese Patent Application No. 2007-213564.

* cited by examiner

SEMICONDUCTOR INTEGRATED CIRCUIT

CROSS-REFERENCE TO RELATED APPLICATION

This application is a continuation of application Ser. No. 12/192,355 filed Aug. 15, 2008 now U.S. Pat. No. 7,995,982.

CLAIM OF PRIORITY

The present application claims priority from Japanese patent application JP 2007-213564 filed on Aug. 20, 2007, the content of which is hereby incorporated by reference into this application.

FIELD OF THE INVENTION

The present invention relates to a semiconductor integrated circuit equipped with an RF transceiver, and particularly to a technique useful to efficiently calibrate a pair of built-in low-pass filters for quadrature signals by the RF transceiver.

BACKGROUND OF THE INVENTION

As compared with the wireless LAN system of the current IEEE802.11b/g, IEEE802.11a provides a data rate of about 5 times the current data rate, at least an overall system capacity of 20 times the current capacity as the standard for a novel wireless LAN based on the Orthogonal Frequency Division Multiplex (OFDM) for a demand for wide wireless communication. In a 5 GHz frequency band, a wireless LAN is shifted from 2.4 GHz to 5 GHz with the advantage of a high data rate. Incidentally, OFDM is an abbreviation of Orthogonal Frequency Division Multiplex. LAN is an abbreviation of Local Area Network.

Described in a non-patent document 1 (Teresa H. Meng et al, "Design and Implementation of an All-CMOS 802.11a Wireless LAN Chipsets", IEEE Communication Magazine, August 2003, PP. 160-168) is that an IEEE802.11a wireless LAN system comprises a physical layer (PHY) and a media access layer (MAC), and the physical layer is based on the orthogonal frequency division multiplex (OFDM). A modulation technique using multi-carriers relaxes the effect of a multipath, and the OFDM distributes data into multi-carriers separated at accurate frequencies. This non-patent document 1 has described that the IEEE802.11a wireless LAN system comprises a CMOS RF transceiver chip and a digital baseband chip.

The RF transceiver comprises an RF receiver for reception, an RF transmitter for transmission and a frequency synthesizer. The frequency synthesizer generates an RF local signal and an IF local signal supplied to the RF receiver and the RF transmitter respectively.

Analog baseband transmission signals I/Q for the RF transmitter are generated by two D/A converters on the baseband chip. Analog baseband reception quadrature signals I/Q for the RF receiver are converted into digital signals by two A/D converters on the baseband chip prior to being processed by a baseband MAC processor.

Dual conversion has been adopted in architectures of the RF receiver and the RF transmitter without direct conversion being adopted therein. In the RF receiver, an RF reception signal is down-converted to reception baseband signals I/Q, based on the RF local signal and the IF local signal supplied from the frequency synthesizer.

In the RF transmitter, the analog baseband transmission signals I/Q are upconverted to an RF transmission signal, based on the RF local signal and the IF local signal supplied from the frequency synthesizer, followed by being amplified by a power amplifier.

In the digital baseband chip, the reception baseband signals I/Q from the receiver of the RF transceiver are supplied to the A/D converters. Digital signals corresponding to the outputs of the A/D converters are supplied to auto correlators via two FIR filters. The outputs of the A/D converters and the outputs of the auto correlators are supplied to a signal detection AGC unit, where the setting of reception gain of an analog front end is executed by the output of this unit. Signal detection, frequency offset evaluation and symbol timing all depend on auto correlation of a cycle or period training symbol supplied to a preamble.

The digital signals corresponding to the outputs of the A/D converters are supplied to one FIR filter, DC offset elimination unit, frequency rotator, fast Fourier transformer (FFT), channel selection filter and Viterbi decoder. Reception data for the media access layer (MAC) is generated from the output of the Viterbi decoder. The fast Fourier converter (FFT) shares an inverse fast Fourier transformer (IFFT) and hardware for the transmitter.

A transceiver corresponding to a 2.4 GHz wireless LAN has been described in a non-patent document 2 (Masoud Zargari et al, "Challenge in The Design of CMOS Transceivers for the IEEE 802.11 Wireless LANs; Past, Present and Future", 2005 IEEE Radio Frequency Integrated Circuits Symposium, PP. 353-356). A SoC (system on chip) for single chip implementation, including a receiver for two-step down-conversion, a transmitter for two-step upconversion, a frequency synthesizer and a baseband MAC unit has been adopted therein. The single chip implementation enables a wide bit-width interface between an RF transceiver and a digital baseband. The wide bit-width interface can be used in various analog/RF non-pairing calibrations.

An RF loop back is coupled between the output of a transmission RF mixer and the input of a reception RF mixer. A predetermined digital sequence is loop-back transferred to the corresponding receiver during calibration. The received digital codes are used for correction of RF non-pairing and RF carrier leaks like a DC offset and an I/Q mismatch.

A patent document 1 (U.S. Pat. No. 6,760,577, Specification of No. B2) has described that RF carriers used in a transmitter and a receiver of a direct conversion transceiver by a fractional phase-locked loop. A second pilot/tone fractional phased-locked loop is used to correct errors in I/Q phase and amplitude at the transmitter and receiver.

RF input terminals of two downconversion mixers of the receiver are supplied with an oscillation output signal of a pilot tone voltage-controlled oscillator of the second pilot/tone fractional phased-locked loop via a first coupler. Reception baseband signals I/Q corresponding to the outputs of the two downconversion mixers are supplied to a baseband digital signal processing circuit, and an error correction value is calculated by two programmable attenuators and two controllable phase shifters of the receiver.

A synthesized RF output of two upconversion mixers of the transmitter is supplied to one input terminal of a transmission I/Q mismatch monitor mixer of a second pilot/tone fractional phase-locked loop via a second coupler. The other input terminal of the transmission I/Q mismatch monitor mixer is supplied with an oscillation output signal of a pilot tone voltage-controlled oscillator of the second pilot/tone fractional phase-locked loop. A signal outputted from the transmission I/Q mismatch monitor mixer is supplied to the input of a logarithmic detector via its corresponding low-pass filter. An error correction value is calculated from the output of the logarithmic detector by two variable attenuators and two controllable phase shifters of the transmitter.

On the other hand, a patent document 2 (Japanese patent laid-open No. 2006-287900) has described a receiving circuit comprising a multi-stage programmable gain amplifier and a multi-stage low-pass filter supplied with I and Q reception baseband signals from quadrature reception mixers for down-conversion of an RF analog LSI used in a cellular phone of the GSM type or the like. The characteristic of the receiving circuit suppresses a blocker level and reduces reception signal distortion. In the patent document 2, variations in the filter characteristics of the low-pass filters due to the manufacturing process of the RF analog LSI are corrected by a calibration circuit and control logic to prevent a bit error rate at reception from being deteriorated.

The calibration circuit includes an amplifier which supplies a reference clock signal to a low-pass filter at the first stage, and a digital phase shift circuit which delays the reference clock signal by the time corresponding to a delay time of the multi-stage programmable gain amplifier. The calibration circuit further includes a first limiter circuit coupled to the output of the phase shift circuit, a second limiter circuit coupled to the output of the final-stage low-pass filter and D-type flip-flops supplied with the outputs of both limiter circuits. The output of each D-type flip-flop is supplied to the control logic. The control logic determines which phase of the outputs of both limiter circuits is advanced, and generates a control code for changing over capacitance values of variable capacitors lying inside the low-pass filters.

SUMMARY OF THE INVENTION

Prior to the present invention, the present inventors et al. have been involved in the research/development of an RF analog LSI based on the IEEE802.11a standard as the standard for a wireless LAN. In the course of its research/development, the present inventors et al. were required to meet even the novel standard of IEEE802.11n for the wireless LAN. The IEEE802.11n standard enables high throughput corresponding to a maximum throughput of 100 Mbps. Functions of MIMO (Multi-input multi-output) and 64QAM (quadrature amplitude modulation) are also required and a demand for coping with signal degradation also becomes strict.

There has thus been a demand for speed-up of the wireless LAN based on the IEEE802.11n standard. When reception power is high, throughput corresponding to it has been required. An enhancement of throughput needs an improvement in S/N ratio. Thus, even when reception power is high, a reduction in noise is further required. An improvement in communication speed needs to enhance the performance of a receiving circuit along with the reduction in noise. In order to enhance the performance of the receiving circuit, there is a need to enhance demodulation signal accuracy of the I and Q reception baseband signals. If variations exist in low-pass filters that generate the I and Q baseband signals, it is then necessary to calibrate the same by the calibration circuit as described in the patent document 2. If this calibration is not done, then the constellation characteristics of the I and Q reception baseband signals are degraded. Thus, assume that the calibrating method described in the patent document 2 is adopted for calibration of both low-pass filters that generate the I and Q reception baseband signals. In doing so, this results in an absolute calibrating method that the characteristics of both low-pass filters related to the I and Q signals are calibrated at the reference delay time of the digital phase shift circuit, which is taken as the reference.

However, the I and Q reception baseband signals generated by the receiving circuit of the RF analog LSI are vector-synthesized by digital signal processing under a baseband processing processor. Thus, various types of modulated signals such as binary phase shift keying (BPSK), quaternary phase shift keying (QPSK), 16QAM (quadrature amplitude modulation), 64QAM, etc. can be demodulated. Upon the vector synthesis by the digital signal processing under the baseband processing processor, the constellation characteristics of the I and Q reception baseband signals are degraded due to a relative mismatch between both I and Q signals other than an absolute mismatch between both I and Q signals.

That is, if the relative mismatch between the two does not exist (if both signals are equal in amplitude-value ratio) even though the absolute variations in both I and Q signals exist, then the constellation characteristics of the vector-synthesized I and Q reception baseband signals are not degraded. Accordingly, in such a case, there is no need to calibrate the absolute variations in the characteristics of both low-pass filters that generate the I and Q reception baseband signals. Thus, the present inventors et al. have reached a conclusion that it is not efficient to calibrate the absolute variations in the characteristics of both low-pass filters that generate the I and Q reception baseband signals.

Further, it has also been revealed by the discussions of the present inventors et al. that when detection errors in the phase detecting operations at both input terminals of the D-type flip-flops of the calibration circuit described in the patent document 2 exist, an error also occurs in the result of calibration by the calibration circuit.

I and Q transmission analog baseband signals processed by a transmitting circuit of the RF analog LSI are generated by D/A-converting I and Q transmission digital baseband signals formed by digital signal processing at the corresponding baseband processing processor by means of transmission D/A converters. Assuming, however, that a D/A conversion frequency is fc upon D/A conversion as well known, aliasing noise having a frequency of $f_N$=nfc±f is contained in the output of each D/A converter in a frequency domain higher than a frequency f of an original signal. Thus, low-pass filters called post filters each having a maximum frequency fmax set to a frequency fc/2 corresponding to one half the D/A conversion frequency fc are coupled to the outputs of the D/A converters, whereby unnecessary components such as aliasing noise are suppressed and necessary frequency components are extracted.

The I and Q transmission analog baseband signals whose unnecessary components are suppressed by the low-pass filters are upconverted to I and Q transmission RF signals by two balanced mixers of a transmission mixer supplied with transmission local signals. The I and Q transmission analog baseband signals are vector-synthesized by an adder coupled to the two balanced mixers, and the so vector-synthesized RF transmission signal is amplified by a power amplifier and transmitted through an antenna.

However, the transmission characteristics are degraded even by a relative mismatch between the low-pass filters (post filters) for suppressing the unnecessary components such as the aliasing noise and thereby generating the I and Q transmission analog baseband signals, thus resulting in the interference with signal transmission at high throughput.

The present invention has been made as a result of the above-described discussions by the present inventors et al. prior to the present invention.

Thus, an object of the present invention is to provide an RF analog LSI capable of efficiently calibrating the characteristics of a pair of reception low-pass filters that suppresses unwanted components contained in I and Q baseband reception signals in a receiving circuit.

Another object of the present invention is to provide an RF analog LSI capable of efficiently calibrating the characteristics of a pair of transmission low-pass filters that suppresses noise due to D/A conversion, which is contained in I and Q transmission analog baseband signals in a transmitting circuit.

A further object of the present invention is to reduce a calibration error by a calibration circuit due to a detection error of the calibration circuit for calibrating the characteristics of low-pass filters.

The above and other objects and novel features of the present invention will become apparent from the description of the present specification and the accompanying drawings.

Representative ones of the inventions disclosed in the present application will be explained in brief as follows:

In reception calibration of one typical RF analog LSI of the present invention, a calibration controller (Cal_Cnt) calibrates a relative mismatch between characteristics of a pair of low-pass filters (LPF_Rx_I, Q) for reception in response to an output signal of a phase detector (PD) which detects a difference in phase between output signals of the low-pass filters (refer to FIG. 2).

In transmission calibration of another typical RF analog LSI of the present invention, a calibration controller (Cal_Cnt) calibrates a relative mismatch between characteristics of a pair of low-pass filters (LPF_Tx_I, Q) for transmission in response to an output signal of a phase detector (PD) which detects a difference in phase between output signals of the low-pass filters (refer to FIG. 8).

Advantageous effects obtained by representative ones of various inventions disclosed in the present application will be described in brief as follows:

There can be provided an RF analog LSI capable of efficiently calibrating characteristics of a pair of reception low-pass filters that generates I and Q reception baseband signals in a receiving circuit.

There can be provided an RF analog LSI capable of efficiently calibrating characteristics of a pair of transmission low-pass filters supplied with I and Q transmission analog baseband signals in a transmitting circuit.

DETAILED DESCRIPTION OF THE PREFERRED EMBODIMENTS

Typical Embodiments

Figure 1:
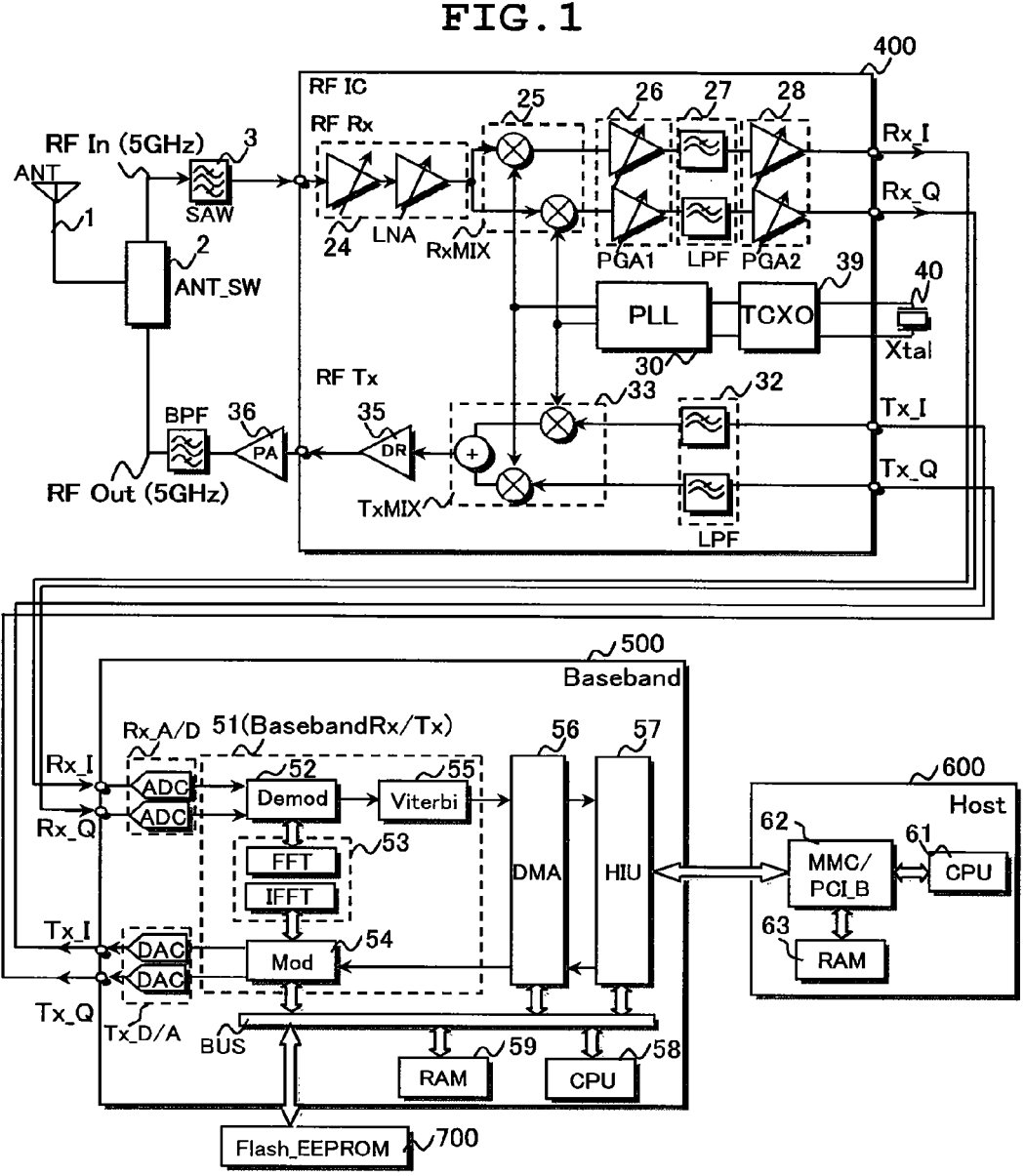
FIG. 1 is a diagram showing a wireless LAN system including a semiconductor integrated circuit corresponding to an RF analog circuit and a baseband processing LSI according to one embodiment of the present invention.

Summaries of typical embodiments of the invention disclosed in the present application will first be explained. Reference numerals in the drawings that refer to with parentheses applied thereto in the description of the summaries of the typical embodiments are merely illustration of ones contained in the concepts of components marked with the reference numerals.

[1] A semiconductor integrated circuit (400) according to a typical embodiment of the present invention is equipped with an RF receiver (RF Rx) which processes an RF reception signal received by an antenna (1), an RF transmitter (RF Tx) which generates an RF transmission signal transmitted from the antenna, and a frequency synthesizer (30) which generates reception local signals supplied to the receiver, and transmission local signals supplied to the transmitter.

The RF receiver includes a low-noise amplifier (24) which amplifies the RF reception signal, a reception mixer (25) supplied with an RF amplified signal corresponding to the output of the low-noise amplifier and the reception local signals, and a reception low-pass filter (27) supplied with downconvert signals generated from the reception mixer.

The downconvert signals are a pair of downconvert signals and the reception low-pass filter includes a pair of reception low-pass filters (LPF_Rx_I, LPF_Rx_Q) supplied with the downconvert signals.

The semiconductor integrated circuit is equipped with a signal supply unit (Rx_I_Sw, Rx_Q_Sw) for supplying a calibration test signal (Ref_Osc) to a pair of input terminals of the reception low-pass filters during an operation for calibration.

The semiconductor integrated circuit is equipped with a phase detection unit (C1, C2, Lmt1, Lmt2, PD) for detecting a difference in phase between signals at a pair of output terminals of the reception low-pass filters during the calibration operation.

Figure 2:
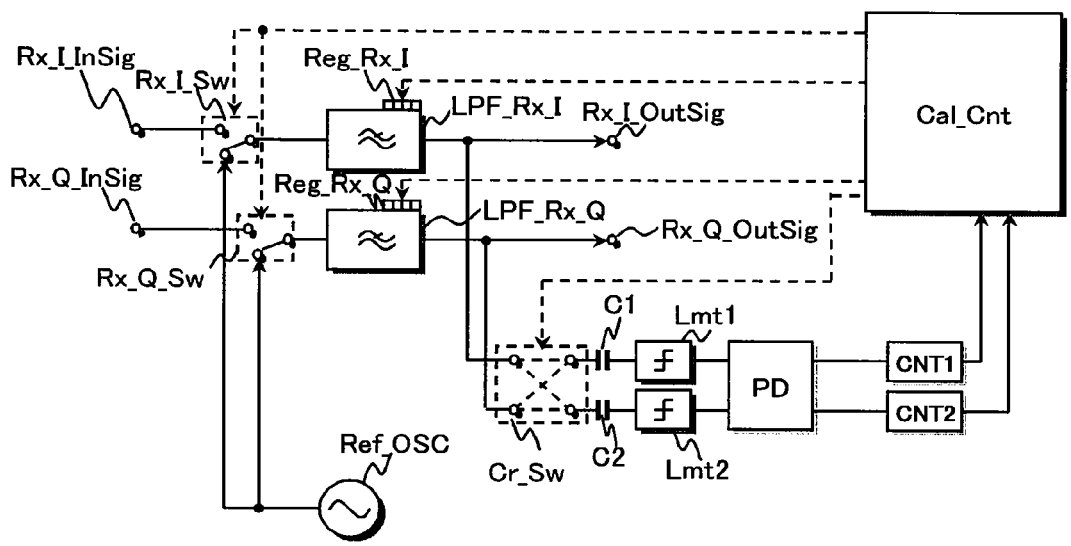
FIG. 2 is a diagram illustrating a configuration of a reception low-pass filter having a calibration function for calibrating a relative mismatch between a pair of filter characteristics of the reception low-pass filter used to generate reception baseband signals by a receiver system of the RF analog LSI shown in FIG. 1.

The semiconductor integrated circuit is further equipped with a calibration controller (Cal_Cnt) for calibrating a relative mismatch between cut-off frequencies of the reception low-pass filters in response to the output of the phase detection unit during the calibration operation (refer to FIG. 2).

According to the embodiment, a relative mismatch between the cut-off frequencies of the reception low-pass filters is calibrated, and a relative mismatch between frequency spectra of the downconvert signals is reduced, thereby making it possible to realize an improvement in the performance of a receiving circuit.

A semiconductor integrated circuit according to a preferred embodiment further includes a switch unit (Cr_Sw) coupled between the pair of output terminals of the reception low-pass filters and a pair of input terminals of the phase detection unit and capable of making a change between straight coupling and cross coupling. The switch unit enables a calibration operation based on the phase detection unit and the calibration controller in a state of the straight coupling and a calibration operation based on the phase detection unit and the calibration controller at the cross coupling.

According to the preferred embodiment, a calibration operation unaffected by a phase comparison error between the pair of input terminals of the phase detection unit is enabled.

In a semiconductor integrated circuit according to a more preferred embodiment, during the calibration operation, the phase detection unit and the calibration controller increase a time constant of the low-pass filter related to the signal advanced in phase, of the output signals of the reception low-pass filters, which are transferred to the pair of input terminals of the phase detection unit, according to an increase in resistance of the corresponding low-pass filter.

According to the more preferred embodiment, since the resistance of the low-pass filter is increased upon the calibration, power consumption of the circuit can be cut down.

In a semiconductor integrated circuit according to another more preferred embodiment, during the calibration operation, the phase detection unit and the calibration controller decrease a time constant of the low-pass filter related to the signal delayed in phase, of the output signals of the reception low-pass filters, which are transferred to the pair of input terminals of the phase detection unit, according to a decrease in resistance of the corresponding low-pass filter.

According to another more preferred embodiment, since the resistance of the low-pass filter is decreased upon the calibration, thermal noise due to the resistance can be cut down.

In a semiconductor integrated circuit according to a further more preferred embodiment, the reception mixer of the RF receiver direct-downconverts the RF amplified signal sent from the output of the low noise amplifier into the pair of downconvert signals corresponding to reception baseband signals.

In a semiconductor integrated circuit according to one concrete embodiment, the RF receiver processes the RF reception signal having a wireless LAN frequency of approximately 5 GHz, and the RF transmitter generates the RF transmission signal having a wireless LAN frequency of about 5 GHz.

In a semiconductor integrated circuit according to the most concrete embodiment, the RF receiver processes the RF reception signal for a wireless LAN based on the IEEE802.11n standard, and the RF transmitter generates the RF transmission signal for the wireless LAN based on the IEEE802.11n standard.

[2] A semiconductor integrated circuit (400) according to a typical embodiment of another aspect of the present invention is equipped with an RF receiver (RF Rx) for processing an RF reception signal received by an antenna (1), an RF transmitter (RF Tx) for generating an RF transmission signal transmitted from the antenna (1), and a frequency synthesizer (30) for generating reception local signals supplied to the RF receiver and transmission local signals supplied to the RF transmitter.

The RF transmitter includes a pair of transmission low-pass filters (32, LPF_Tx_I, LPF_Tx_Q) supplied with a pair of transmission analog baseband signals (Tx_I, Tx_Q) generated by D/A-converting a pair of transmission digital baseband signals formed by a baseband processing processor (500), a pair of transmission mixers (33) supplied with a pair of output signals of the transmission low-pass filters and the transmission local signals, and an adder supplied with a pair of output signals of the transmission mixers thereby to generate upconvert signals.

The semiconductor integrated circuit is equipped with a signal supply unit (Tx_I_Sw, Tx_Q_Sw) for supplying a calibration test signal (Ref_Osc) to a pair of input terminals of the transmission low-pass filters during an operation for calibration.

The semiconductor integrated circuit is equipped with a phase detection unit (C1, C2, Lmt1, Lmt2, PD) for detecting a difference in phase between signals at a pair of output terminals of the transmission low-pass filters during the calibration operation.

Figure 8:
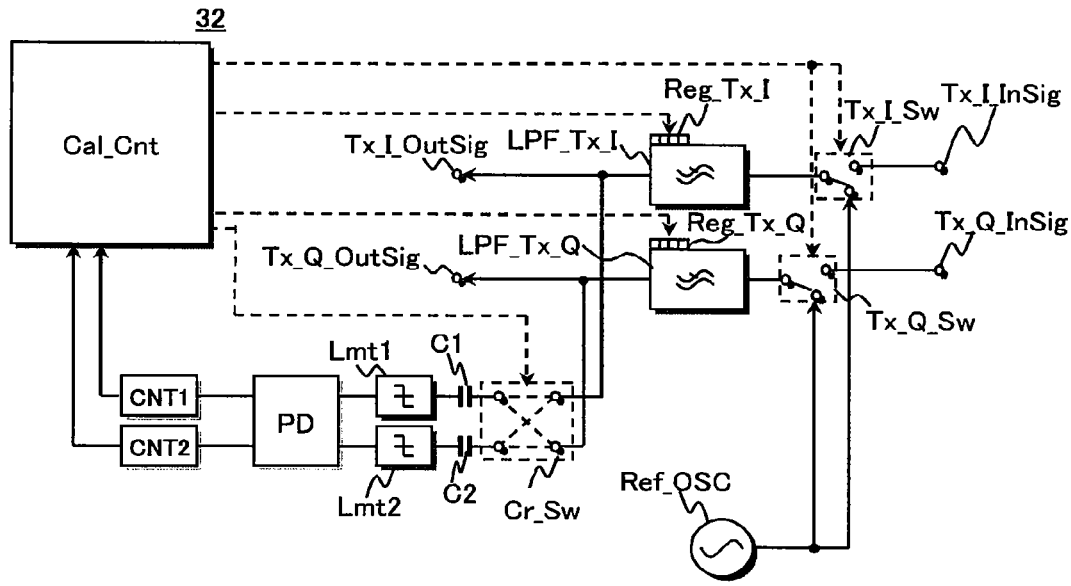
FIG. 8 is a diagram showing a configuration of a low-pass filter having a calibration function for calibrating a relative mismatch between a pair of filter characteristics of the low-pass filter supplied with analog transmission baseband signals by the transmitter system of the RF analog integrated circuit shown in FIG. 1.

The semiconductor integrated circuit is further equipped with a calibration controller (Cal_Cnt) for calibrating a relative mismatch between cut-off frequencies of the transmission low-pass filters in response to the output of the phase detection unit during the calibration operation (refer to FIG. 8).

According to the embodiment, a relative mismatch between cut-off frequencies of the transmission low-pass filters is calibrated, and a relative mismatch between frequency spectra of the downconvert signals is reduced, thereby making it possible to realize an improvement in the performance of a transmitting circuit.

A semiconductor integrated circuit according to a preferred embodiment further includes a switch unit (Cr_Sw) coupled between the pair of output terminals of the transmission low-pass filters and a pair of input terminals of the phase detection unit and capable of making a change between straight coupling and cross coupling. The switch unit enables a calibration operation based on the phase detection unit and the calibration controller in a state of the straight coupling and a calibration operation based on the phase detection unit and the calibration controller at the cross coupling.

According to the preferred embodiment, a calibration operation unaffected by a phase comparison error between the pair of input terminals of the phase detection unit is enabled.

In a semiconductor integrated circuit according to a more preferred embodiment, during the calibration operation, the phase detection unit and the calibration controller increase a time constant of the low-pass filter related to the signal advanced in phase, of the output signals of the transmission low-pass filters, which are transferred to the pair of input terminals of the phase detection unit, according to an increase in resistance of the corresponding low-pass filter.

According to the more preferred embodiment, since the resistance of the low-pass filter is increased upon the calibration, power consumption of the circuit can be cut down.

In a semiconductor integrated circuit according to another preferred embodiment, during the calibration operation, the phase detection unit and the calibration controller decrease a time constant of the low-pass filter related to the signal delayed in phase, of the output signals of the transmission low-pass filters, which are transferred to the pair of input terminals of the phase detection unit, according to a decrease in resistance of the corresponding low-pass filter.

According to another more preferred embodiment, since the resistance of the low-pass filter is decreased upon the calibration, thermal noise due to the resistance can be cut down.

In a semiconductor integrated circuit according to a further more preferred embodiment, the transmission mixers and the adder in the RF transmitter direct-upconvert the pair of output signals of the transmission low-pass filters into the upconvert signals indicative of the RF transmission signal.

In a semiconductor integrated circuit according to one concrete embodiment, the RF receiver processes the RF reception signal having a wireless LAN frequency of approximately 5 GHz, and the RF transmitter generates the RF transmission signal having a wireless LAN frequency of approximately 5 GHz.

In a semiconductor integrated circuit according to the most concrete embodiment, the RF receiver processes the RF reception signal for a wireless LAN based on the IEEE802.11n standard, and the RF transmitter generates the RF transmission signal for the wireless LAN based on the IEEE802.11n standard.

[3] A semiconductor integrated circuit according to a typical embodiment of a further different aspect of the present invention is equipped with an RF receiver (RF Rx) for processing an RF reception signal received by an antenna (1), an RF transmitter (RF Tx) for generating an RF transmission signal transmitted from the antenna, and a frequency synthesizer (30) for generating reception local signals supplied to the RF receiver and transmission local signals supplied to the RF transmitter.

The RF receiver includes a low noise amplifier (24) for amplifying the RF reception signal, a reception mixer (25) supplied with an RF amplified signal corresponding to an output of the low noise amplifier and the reception local signals, and a reception low-pass filter (27) supplied with downconvert signals generated from the reception mixer.

The downconvert signals are a pair of downconvert signals and the reception low-pass filter includes a pair of reception low-pass filters (LPF_Rx_I, LPF_Rx_Q) supplied with the downconvert signals.

The RF transmitter includes a pair of transmission low-pass filters (32, LPF_Tx_I, LPF_Tx_Q) supplied with a pair of transmission analog baseband signals (Tx_I, Tx_Q) generated by D/A-converting a pair of transmission digital baseband signals formed by a baseband processing processor (500), a pair of transmission mixers (33) supplied with a pair of output signals of the transmission low-pass filters and the transmission local signals, and an adder supplied with a pair of output signals of the transmission mixers thereby to generate upconvert signals.

The semiconductor integrated circuit is equipped with a reception signal supply unit (Rx_I_Sw, Rx_Q_Sw) for supplying a reception calibration test signal (Ref_Osc) to a pair of input terminals of the reception low-pass filters during an operation for reception calibration.

The semiconductor integrated circuit is equipped with a phase detection unit (C1, C2, Lmt1, Lmt2, PD) for detecting a difference in phase between signals at a pair of output terminals of the reception low-pass filters during the reception calibration operation.

The semiconductor integrated circuit is further equipped with a calibration controller (Cal_Cnt) for calibrating a relative mismatch between cut-off frequencies of the reception low-pass filters in response to the output of the phase detection unit during the reception calibration operation (refer to FIG. 2).

The semiconductor integrated circuit is equipped with a transmission signal supply unit (Tx_I_Sw, Tx_Q_Sw) for supplying a transmission calibration test signal (Ref_Osc) to a pair of input terminals of the transmission low-pass filters during an operation for transmission calibration.

During the transmission calibration operation, the transmission signal supply unit (Tx_I_Sw, Tx_Q_Sw) supplies the transmission calibration test signal (Ref_Osc) to the pair of input terminals of the transmission low-pass filters.

During the transmission calibration operation, the phase detection unit (C1, C2, Lmt1, Lmt2, PD) detects a difference in phase between signals at a pair of output terminals of the transmission low-pass filters.

During the transmission calibration operation, the calibration controller (Cal_Cnt) calibrates a relative mismatch between the cut-off frequencies of the transmission low-pass filters in response to the output of the phase detection unit (refer to FIG. 8).

According to the embodiment, a relative mismatch between cut-off frequencies of the reception low-pass filters is calibrated, and a relative mismatch between frequency spectra of the downconvert signals is reduced, thereby making it possible to realize an improvement in the performance of a receiving circuit. A relative mismatch between cut-off frequencies of the transmission low-pass filters is calibrated, and a relative mismatch between frequency spectra of the downconvert signals is reduced, thereby making it possible to realize an improvement in the performance of the receiving circuit. Further, the phase detection unit and the calibration controller can be shared for the reception calibration and the transmission calibration.

A semiconductor integrated circuit according to a preferred embodiment is further equipped with a switch unit (Cr_Sw) coupled between the pair of output terminals of the reception low-pass filters and a pair of input terminals of the phase detection unit and capable of making a change between reception straight coupling and reception cross coupling. The switch unit enables a reception calibration operation based on the phase detection unit and the calibration controller in a state of the reception straight coupling and a reception calibration operation based on the phase detection unit and the calibration controller at the reception cross coupling. The switch unit is further coupled between the pair of output terminals of the transmission low-pass filters and the pair of input terminals of the phase detection unit and capable of making a change between transmission straight coupling and transmission cross coupling. The switch unit enables a transmission calibration operation based on the phase detection unit and the calibration controller in a state of the transmission straight coupling and a transmission calibration operation based on the phase detection unit and the calibration controller at the transmission cross coupling.

According to the preferred embodiment, calibration operations unaffected by a phase comparison error between the pair of input terminals of the phase detection unit are enabled by the reception calibration operation and the transmission calibration operation.

In a semiconductor integrated circuit according to a more preferred embodiment, during the operation for either of the reception calibration and the transmission calibration, the phase detection unit and the calibration controller increase a time constant of the low-pass filter related to a signal advanced in phase, of output signals of a pair of low-pass filters, which are transferred to the pair of input terminals of the phase detection unit, according to an increase in resistance of the corresponding low-pass filter.

According to the more preferred embodiment, since the resistance of the low-pass filter is increased during the operation for either of the reception calibration and the transmission calibration, power consumption of the circuit can be cut down.

In a semiconductor integrated circuit according to another more preferred embodiment, during the operation for either of the reception calibration and the transmission calibration, the phase detection unit and the calibration controller decrease a time constant of the low-pass filter related to the signal delayed in phase, of the output signals of the pair of low-pass filters, which are transferred to the pair of input terminals of the phase detection unit, according to a decrease in resistance of the corresponding low-pass filter.

According to another more preferred embodiment, since the resistance of each low-pass filter is reduced even during the operation for either of the reception calibration and the transmission calibration, thermal noise due to the resistance can be cut down.

In a semiconductor integrated circuit according to a further more preferred embodiment, the reception mixer of the RF receiver direct-downconverts the RF amplified signal sent from the output of the low noise amplifier into the pair of downconvert signals corresponding to reception baseband signals. The transmission mixers and the adder in the RF transmitter direct-upconvert the pair of output signals of the transmission low-pass filters into the upconvert signals indicative of the RF transmission signal.

In a semiconductor integrated circuit according to one concrete embodiment, the RF receiver processes the RF reception signal having a wireless LAN frequency of approximately 5 GHz, and the RF transmitter generates the RF transmission signal having a wireless LAN frequency of approximately 5 GHz.

In a semiconductor integrated circuit according to the most concrete embodiment, the RF receiver processes the RF reception signal for a wireless LAN based on the IEEE802.11n standard, and the RF transmitter generates the RF transmission signal for the wireless LAN based on the IEEE802.11n standard.

DESCRIPTION OF EMBODIMENT

Preferred embodiments will next be described in further detail.

<<RF Analog Semiconductor Integrated Circuit and Baseband Processing LSI Employed in Wireless LAN>>

FIG. 1 is a diagram showing a wireless LAN system including a semiconductor integrated circuit corresponding to an RF analog circuit 400 and a baseband processing LSI 500 according to one embodiment of the present invention. The wireless LAN system shown in FIG. 1 can be commonly used in LAN equipment of a wireless LAN and an access point of a communication partner.

An antenna switch 2 is coupled to an antenna 1, and the supply of an RF reception input signal from the antenna 1 to a receiver system and the supply of an RF transmission output signal from a transmitter system to the antenna 1 are performed by time division multiple access (TDMA). The wireless LAN system shown in FIG. 1 enables communications at a maximum throughput of 100 Mbps based on the IEEE802.11n standard.

<<RF Analog Semiconductor Integrated Circuit>>
<<Receiver System>>

Since a direct downconversion receiver system RF Rx of the RF analog semiconductor integrated circuit 400 shown in FIG. 1 comprises a low noise amplifier 24, a reception mixer 25, programmable gain amplifiers 26 and 28 and a built-in low-pass filter 27 to correspond to a frequency band of about 5 GHz (5.15 GHz through 5.35 GHz) based on the IEEE802.11a standard.

The RF reception signal lying in the frequency band of about 5 GHz, which has been received by the antenna 1, is amplified by the low noise amplifier 24, followed by being supplied to one input terminals of two balanced mixers lying inside the reception mixer 25. The other input terminals of the two balanced mixers lying thereinside are supplied with two reception local signals of a frequency of about 5 GHz, having a phase difference of 90°, which are formed by a ΣΔ fractional PLL frequency synthesizer 30. As a result, two analog reception baseband signals having a phase difference of 90°, which have frequency components corresponding to the difference between the frequency of the RF reception signal received at the antenna 1 and the frequencies of the reception local signals are generated from their corresponding outputs of the two balanced mixers lying inside the reception mixer 25.

The analog reception baseband signals are amplified by the first-stage programmable gain amplifier 26, followed by being supplied to the low-pass filter 27. Signals outputted from the low-pass filter 27 are amplified by the final-stage programmable gain amplifier 28. Since the baseband signals outputted from the reception mixer 25 contain high-frequency components of an image signal, an adjacent channel blocker and reception signal distortion, they are eliminated by the low-pass filter 27 for the reception baseband. Incidentally, the image signal is of an undesired signal component having a frequency component corresponding to the sum of the RF reception signal and the frequency of each reception local signal.

The analog reception baseband signals Rx_I and Rx_Q generated by the direct downconversion receiver system RF Rx in this way are supplied to a reception A/D converter Rx_A/D of LSI corresponding to the baseband processing unit 500. Incidentally, the reception A/D converter Rx_A/D can also be formed in the RF analog semiconductor integrated circuit 400 without being formed in a chip for the baseband processing LSI 500. Incidentally, each of the programmable gain amplifiers 26 and 28, and the low-pass filter 27 actually include programmable gain amplifiers of three stages and low-pass filters of four stages respectively. An input low-pass filter and an output low-pass filter are respectively coupled to the input and output of one programmable gain amplifier. Thus, signals outputted from the final-stage low-pass filter or the final-stage programmable gain amplifier 28 are supplied to the reception A/D converter Rx_A/D of the baseband processing LSI 500.

<<Transmitter System>>

Analog transmission baseband signals Tx_I and Tx_Q generated from a transmission D/A converter Tx_D/A of the baseband processing LSI 500 are supplied to the RF analog semiconductor integrated circuit 400. Incidentally, the transmission D/A converter Tx_D/A can also be formed in the RF analog semiconductor integrated circuit 400 without being formed in the chip for the baseband processing LSI 500.

A direct upconversion transmitter system RF Tx of the RF analog semiconductor integrated circuit 400 shown in FIG. 1 comprises a built-in low-pass filter 32, a transmitter mixer 33 and a driver amplifier 35 to correspond to the frequency band of about 5 GHz based on the IEEE802.11a standard. A power amplifier 36 and a bandpass filter BPF are coupled to the output of the driver amplifier 35 outside the RF analog semiconductor integrated circuit 400. A surface acoustic wave filter 3 is coupled to the input of the low noise amplifier 24 outside the RF analog semiconductor integrated circuit 400.

Analog transmission baseband signals Tx_I and Tx_Q of the transmission D/A converter Tx_D/A, which are suppressed in aliasing noise or the like by the low-pass filter 32, are respectively supplied to one input terminals of two balanced mixers lying inside the transmission mixer 33. The other input terminals of the two balanced mixers lying thereinside are respectively supplied with two transmission local signals of a frequency of about 5 GHz, having a phase difference of approximately 90°, which are formed by the ΣΔ fractional PLL frequency synthesizer 30. Thus, two transmit or transmission signals up-converted to an RF transmission frequency of about 5 GHz are formed from the outputs of the two balanced mixers lying inside the transmission mixer 33. As a result, a vector-synthesized RF transmission signal is generated from the output of an adder coupled to the outputs of the two balanced mixers lying inside the transmission mixer 33 and supplied to the input of the driver amplifier 35.

<<PLL Frequency Synthesizer>>

The reception local signals supplied to the reception mixer 25 of the RF analog semiconductor integrated circuit 400, and the transmission local signals supplied to the transmission mixer 33 thereof are generated from the ΣΔ fractional PLL frequency synthesizer 30. A system clock generator (TCXO) 39 is coupled to the PLL frequency synthesizer 30, and a crystal unit 40 is coupled to the system clock generator 39 outside the RF analog semiconductor integrated circuit 400.

Incidentally, the system clock generator (TCXO) 39 is formed outside the RF analog semiconductor integrated circuit 400, and a clock buffer may be formed inside the RF analog semiconductor integrated circuit 400. The clock buffer lying inside the RF analog semiconductor integrated circuit 400 receives a system clock signal formed from the system clock generator (TCXO) 39 and supplies the same to the ΣΔ fractional PLL frequency synthesizer 30 provided inside the RF analog semiconductor integrated circuit 400.

<<Baseband Processing LSI, Flash Memory, Host>>

The baseband processing LSI 500 is coupled to the RF analog semiconductor integrated circuit 400.

The baseband processing LSI 500 includes the reception A/D converter Rx_A/D, the transmission D/A converter Tx_D/A, a baseband Tx/Rx processing unit 51, a DMA transfer unit 56, a host interface unit 57, a bus BUS, a central processing unit 58 and a random access memory 59.

The baseband Tx/Rx processing unit 51 includes a demodulator (Demod) 52, a fast Fourier transformer (FFT)/inverse fast Fourier transformer (IFFT) 53, a modulator (Mod) 54 and a Viterbi decoder 55. Digital reception baseband signals sent from the reception A/D converter Rx_A/D are supplied to the demodulator (Demod) 52. Digital transmission baseband signals are generated from the modulator (Mod) 54 to the transmission D/A converter Tx_D/A.

Incidentally, although not illustrated in the drawing, the inputs of a signal detection AGC unit are coupled to the outputs of the reception A/D converter Rx_A/D of the baseband processing LSI 500. An auto gain control output signal of the signal detection AGC unit is supplied to the low noise amplifier 24 and programmable gain amplifiers 26 and 28 of the direct downconversion receiver system RF Rx of the RF analog semiconductor integrated circuit 400 to perform auto gain control.

The host interface unit 57 is coupled to a host 600 like a personal computer (PC) via a PCI bus. The host 600 includes a central processing unit 61, a memory controller/PCI bus bridge 62 and a random access memory 63. Data transmitted/received between the host interface unit 57 and the baseband Tx/Rx processing unit 51 are transferred by the DMA transfer unit 56. Incidentally, PCI is an abbreviation of Peripheral Component Interconnect, and DMA is an abbreviation of Direct Memory Access. An external flash non-volatile memory 700 is coupled to a bus of the baseband processing LSI 500. Control programs for the RF analog semiconductor integrated circuit 400 and the baseband processing LSI 500 are stored in the external flash non-volatile memory 700.

In particular, a calibration control program for performing calibration for reducing a relative mismatch between the two low-pass filters lying inside the reception low-pass filter 27 for generating the I and Q reception baseband signals according to the embodiment of the present invention has been stored in its corresponding read only memory (ROM) lying inside the RF analog semiconductor integrated circuit 400. Further, a calibration control program for performing calibration for reducing a relative mismatch between the two low-pass filters lying inside the transmission low-pass filter 32 supplied with the I and Q transmission analog baseband signals according to another embodiment of the present invention has been stored in its corresponding read only memory (ROM) lying inside the RF analog semiconductor integrated circuit 400.

In another embodiment, however, these calibration control programs can also be stored in the external flash non-volatile memory 700. With power-on, the control program is transferred from the external flash non-volatile memory 700 to the corresponding random access memory lying inside the RF analog semiconductor integrated circuit 400 to allow a calibration control circuit or controller lying inside the RF analog semiconductor integrated circuit 400 to execute instructions of the control program.

<<Fast Fourier Transformation/Inverse Fast Fourier Transformation for OFDM Transmission/Reception>>

Signal processing for data reception/demodulation based on OFDM of the wireless LAN is mainly controlled by the direct downconversion receiver system RF Rx of the RF analog semiconductor integrated circuit 400, and the reception A/D converter Rx_A/D, demodulator 52, fast Fourier transformer 53 and Viterbi decoder 55 of the baseband processing LSI 500.

Signal processing for modulation/data transmission based on OFDM of the wireless LAN is mainly controlled by the modulator 54, inverse fast Fourier converter 53 and transmission D/A converter Tx_D/A of the baseband processing LSI 500, and the direct upconversion transmitter system RF Tx and power amplifier 36 of the RF analog semiconductor integrated circuit 400.

<<Calibration of Reception Low-Pass Filter for Generating I and Q Reception Baseband Signals>>

I and Q quadrature reception baseband signals are generated from the outputs of the reception mixer 25 of the receiver system RF Rx of the RF analog LSI 400. Since the baseband signals outputted from the reception mixer 25 contain high-frequency components of an image signal, an adjacent channel blocker and reception signal distortion, they are eliminated by the low-pass filter 27 for the reception baseband. The I and Q reception baseband signals Rx_I and Rx_Q corresponding to the output signals of the final-stage low-pass filter 27 or the final-stage programmable gain amplifier 28 are supplied to the reception A/D converter Rx_A/D of the baseband processing LSI 500, where they are converted into digital baseband signals.

After the I and Q reception baseband signals Rx_I and Rx_Q generated by the receiver system RF Rx of the RF analog LSI 400 have been converted to the digital baseband signals by the reception A/D converter Rx_A/D, they are vector-synthesized by digital signal processing at the baseband Tx/Rx processing unit 51 of the baseband processing LSI 500. Consequently, various types of modulated signals such as BPSK, QPSK, 16QAM, 64QAM, etc. can be demodulated.

Upon the vector synthesis by the digital signal processing, the constellation characteristics of the I and Q reception baseband signals are degraded due to a relative variation between both of the I and Q signals. A signal that occurs due to a mismatch corresponding to the relative variation between both of the I and Q signals becomes noise and interferes with the implementation of high throughput based on the IEEE802.11n standard.

Thus, there is a need to perform calibration for calibrating the relative mismatch between both filter characteristics of the low-pass filter 27 used to generate the I and Q reception baseband signals Rx_I and Rx_Q by the receiver system RF Rx of the RF analog integrated circuit 400 shown in FIG. 1. The receiver system RF Rx of the RF analog LSI 400 shown in FIG. 1 has a calibration function for calibrating the mismatch between both filter characteristics of the low-pass filter 27.

<<Reception Low-Pass Filter Having Calibration Function>>

FIG. 2 is a diagram illustrating a configuration of a reception low-pass filter 27 having a calibration function for calibrating a relative mismatch between both filter characteristics of the reception low-pass filter 27 used to generate I and Q reception baseband signals Rx_I and Rx_Q by the receiver system RF Rx of the RF analog LSI 400 shown in FIG. 1.

Signal input terminals Rx_I_InSig and Rx_Q_InSig of the low-pass filter 27 shown in FIG. 2 are respectively supplied with I and Q quadrature or orthogonal reception baseband signals from the outputs of the reception mixer 25 of the receiver system RF Rx of the RF analog LSI 400 shown in FIG. 1. One input terminals of switches Rx_I_Sw and Rx_Q_Sw are coupled to their corresponding signal input terminals Rx_I_InSig and Rx_Q_InSig of the low-pass filter 27. A test signal for calibration from a referential signal generator Ref_Osc is supplied to the other input terminals of the switches Rx_I_Sw and Rx_Q_Sw. An input selection control signal from a calibration controller Cal_Cnt is supplied to input selection control terminals of the switches Rx_I_Sw and Rx_Q_Sw.

Low-pass filter circuits LPF_Rx_I and LPF_Rx_Q for the core of the low-pass filer 27 targeted for calibration are coupled to their corresponding output terminals of the switches Rx_I_Sw and Rx_Q_Sw. Incidentally, although a sine wave is used as the waveform of the test signal generated from the referential signal generator Ref_Osc for the purpose of calibration, a rectangular pulse waveform can be used as another waveform of the test signal.

The low-pass filter circuits LPF_Rx_I and LPF_Rx_Q for the low-pass filter 27 actually include programmable gain amplifiers of three stages and low-pass filters of four stages respectively. An input low-pass filter and an output low-pass filter are respectively coupled to the input and output of one programmable gain amplifier. Thus, I and Q reception baseband signals Rx_I and Rx_Q corresponding to output signals of the final-stage low-pass filter or the final-stage programmable gain amplifier are generated at their corresponding signal output terminals Rx_I_OutSig and Rx_Q_OutSig of the low-pass filter 27. The low-pass filter circuits LPF_Rx_I and LPF_Rx_Q respectively include control registers Reg_Rx_I and Reg_Rx_Q which store control codes for calibration from the calibration controller Cal_Cnt.

While the signal output terminals Rx_I_OutSig and Rx_Q_OutSig of the low-pass filter 27 are coupled to their corresponding input terminals of the reception A/D converter Rx_A/D of the baseband processing LSI 500, they are coupled to a pair of input terminals of a cross switch Cr_Sw. A pair of output terminals of the cross switch Cr_Sw is coupled to its corresponding input terminals of waveform shaping limiter amplifiers Lmt1 and Lmt2 via coupling capacitors C1 and C2. A cross input selection control signal sent from the calibration controller Cal_Cnt is supplied to a cross input selection control terminal of the cross switch Cr_Sw. The output terminals of the limiter amplifiers Lmt1 and Lmt2 are coupled to their corresponding input terminals of a phase detector PD. The output terminals of the phase detector PD are coupled to their corresponding input terminals of counters CNT1 and CTN2 for storing an accumulation of a result of phase comparison. The output terminals of the counters CNT1 and CNT2 are coupled to their corresponding input terminals of the calibration controller Cal_Cnt.

Thus, it is noted that the overall filter characteristics of both the frequency characteristics of the programmable gain amplifiers of three stages and the characteristics of the low-pass filters of four stages that configure the low-pass filter circuits LPF_Rx_I and LPF_Rx_Q for the core of the low-pass filter 27 respectively are supplied to both inputs of the phase detector PD. Accordingly, the phase detector PD detects a relative mismatch between the overall filter characteristics of both low-pass filter circuits LPF_Rx_I and LPF_Rx_Q of the low-pass filter 27.

<<Basic Reception Calibration Operation>>

In an ideal state, the overall filter characteristics of both the low-pass filter circuits LPF_Rx_I and LPF_Rx_Q of the low-pass filter 27 become completely identical to each other, and the signals at both inputs of the phase detector PD also become completely identical to each other. In a practical state, however, a relative mismatch occurs between the overall filter characteristics of both low-pass filter circuits LPF_Rx_I and LPF_Rx_Q of the low pass filter 27 due to variations in the manufacturing process of the RF analog LSI and variations in the dependence of each circuit element on the temperature. The relative mismatch between the low-pass filter circuits LPF_Rx_I and LPF_Rx_Q is reflected on the difference in phase between both input signals of the phase detector PD.

According to the present embodiment of the present invention, the calibration for reducing the relative mismatch between both low-pass filter circuits LPF_Rx_I and LPF_Rx_Q lying inside the low-pass filter 27 of the RF analog LSI 400 is executed inside the low-pass filter 27 shown in FIG. 2 in the wireless LAN system of FIG. 1 upon power-on and the start of a communication operation.

Namely, when the operation of calibration is started, the calibration controller Cal_Cnt changes the selection of the switches Rx_I_Sw and Rx_Q_Sw thereby to supply a test signal of the referential signal generator Ref_Osc to the inputs of the low-pass filter circuits LPF_Rx_I and LPF_Rx_Q via the switches Rx_I_Sw and Rx_Q_Sw. The calibration controller Cal_Cnt sets the cross switch Cr_Sw to straight coupling in accordance with the cross input selection control signal. In doing so, signals outputted from both low-pass filter circuits LPF_Rx_I and LPF_Rx_Q that respond to the test signal of the same waveform from the referential signal generator Ref_Osc are respectively supplied to the input terminals of the limiter amplifiers Lmt1 and Lmt2 via the straight-coupled cross switch Cr_Sw and the coupling capacitors C1 and C2.

The phase detector PD detects a difference in phase between both input signals supplied from the outputs of the limiter amplifiers Lmt1 and Lmt2 to both input terminals of the phase detector PD. In response to a phase error signal corresponding to the output of the phase detector PD, the calibration controller Cal_Cnt changes a control code for either of the control registers Reg_Rx_I and Reg_Rx_Q. Thus, the relative mismatch between the overall filter characteristics of both low-pass filter circuits LPF_Rx_I and LPF_Rx_Q of the low-pass filter 27 can be calibrated by using the phase detector PD and the calibration control circuits or controllers LPF_Rx_I and LPF_Rx_Q.

As a consequence, a relative mismatch between the cut-off frequencies of both low-pass filter circuits LPF_Rx_I and LPF_Rx_Q of the low-pass filter 27 is calibrated. As a result, relative variations in the frequency spectra of the I and Q reception baseband signals Rx_1 and Rx_Q are reduced and an improvement in the performance of a receiving circuit can be realized.

<<Second Reception Calibration by Cross Switch>>

There is a possibility that errors will be contained in phase comparing functions of both input terminals of the phase detector PD due to errors in the transfer delay characteristics between the input and output terminals of the cross switch Cr_Sw, an error between the coupling capacitors C1 and C2 and a delay error between the two limiter amplifiers Lmt1 and Lmt2.

Thus, the cross switch Cr_Sw is changed from the straight coupling to cross coupling in response to a cross input selection control signal of another level after the first calibration by the straight connection of the cross switch Cr_Sw. As a result, the output signals of both low-pass filter circuits LPF_Rx_I and LPF_Rx_Q of the low-pass filter 27 are respectively supplied to the input terminals of the limiter amplifiers Lmt2 and Lmt1 via the cross-coupled cross switch Cr_Sw and the coupling capacitors C2 and C1. At this time, a test signal of the same waveform from the referential signal generator Ref_Osc is supplied to the inputs of the low-pass filter circuits LPF_Rx_I and LPF_Rx_Q via the switches Rx_I_Sw and Rx_Q_Sw in a manner similar to the first calibration.

In this state, the phase detector PD detects again a phase difference between both input signals supplied from the outputs of the limiter amplifiers Lmt2 and Lmt1 to both input terminals of the phase detector PD. The calibration controller Cal_Cnt crosses the control registers Reg_Rx_I and Reg_Rx_Q as mentioned before to change the control code for one of the control registers. As a result, the second calibration by the cross coupling of the cross switch Cr_Sw is executed.

Thus, the accurate calibration of the low-pass filter circuits LPF_Rx_I and LPF_Rx_Q of the low-pass filter 27, which is unaffected by the phase comparison error of the phase detector PD, is enabled.

Incidentally, the counters CNT1 and CNT2 coupled between the outputs of the phase detector PD and the inputs of the calibration controller Cal_Cnt respectively store an accumulation of a result of phase comparison by the phase detector PD. Consequently, the calibration controller Cal_Cnt is also capable of performing calibration of the low-pass filter circuits from a statistical result of the accumulation of the result of phase comparison.

<<Reception Calibration Operation for Low Power Consumption>>

In one embodiment of the present invention, the phase detector PD and the calibration controller Cal_Cnt increase the time constant of the low-pass filter circuit related to one advanced in phase, of both input signals supplied from the outputs of the limiter amplifiers Lmt1 and Lmt2 to both input terminals of the phase detector PD upon the first and second calibrations.

The time constant of the low-pass filter circuit can be set according to each of resistors and each of capacitors that configure the low-pass filter circuit. Increasing either the resistance value of the resistor or the capacitance value of the capacitor enables an increase in the time constant.

Assume that when the phase of the output signal of the limiter amplifier Lmt1 is leading that of the output signal of the limiter amplifier Lmt2, the phase detector PD detects it. In doing so, the calibration controller Cal_Cnt controls a control code of the control register Reg_Rx_I in response to the output of the phase detector PD. Thus, the time constant of one low-pass filter circuit LPF_Rx_I in the low-pass filter 27 increases.

In doing so, the phases of both input signals of the phase detector PD coincide with each other. As a result, a relative mismatch between the overall filter characteristics of the low-pass filter circuits LPF_Rx_I and LPF_Rx_Q of the low-pass filter 27 can be calibrated by the calibration controller Cal_Cnt.

Increasing the resistance value of the resistor of each low-pass filter circuit is made possible by changing coupling forms of a plurality of switches coupled to a plurality of resistors. In a GmC filter using an operational transconductance amplifier (OTA), an effective resistance (Reff=1/Gm) can be increased by reducing the dc bias current of the operational transconductance amplifier (OTA). In either case, power consumption of the circuit can be cut down by the increase in the resistance value of each resistor in the low-pass filter circuit.

<<Reception Calibration Operation for Low Noise>>

In another embodiment of the present invention, the phase detector PD and the calibration controller Cal_Cnt decrease the time constant of the low-pass filter circuit related to one delayed in phase, of both input signals supplied to both input terminals of the phase detector PD upon the first and second calibrations.

Decreasing the resistance value of each resistor that configures the low-pass filter enables a decrease in the time constant. Decreasing the resistance value of the resistor of each low-pass filter circuit is made possible by changing coupling forms of a plurality of switches coupled or tied to a plurality of resistors.

In the GmC filter using the operational transconductance amplifier (OTA), the effective resistance (Reff=1/Gm) can be decreased by increasing the dc bias current of the operational transconductance amplifier (OTA). In either case, thermal noise due to the resistor of the circuit can be reduced by the decrease in the resistance value of each resistor in the low-pass filter circuit.

<<Phase Detector>>

Figure 3:
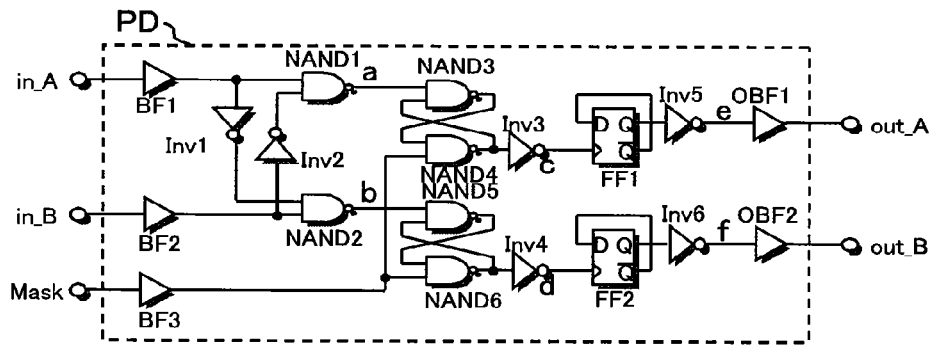
FIG. 3 is a diagram depicting one example of a configuration of a phase detector of the reception low-pass filter shown in FIG. 2.

FIG. 3 is a diagram showing one example of a configuration of the phase detector PD of the low-pass filter 27 shown in FIG. 2. Input terminals in_A and in_B of the phase detector PD shown in FIG. 3 are respectively coupled to the coupling capacitors C1 and C2 shown in FIG. 2. A mask signal input terminal Mask is supplied with a mask signal generated from a test signal of the referential signal generator Ref_Osc.

Output terminals out_A and out_B of the phase detector PD are coupled to their corresponding counters CNT1 and CNT2. The phase detector PD shown in FIG. 3 includes buffers BF1 through BF3, inverters Inv1 through Inv6, NAND circuits NAND1 through NAND6, flip-flops FF1 and FF2 and output buffers OBF1 and OBF2.

Figure 4:
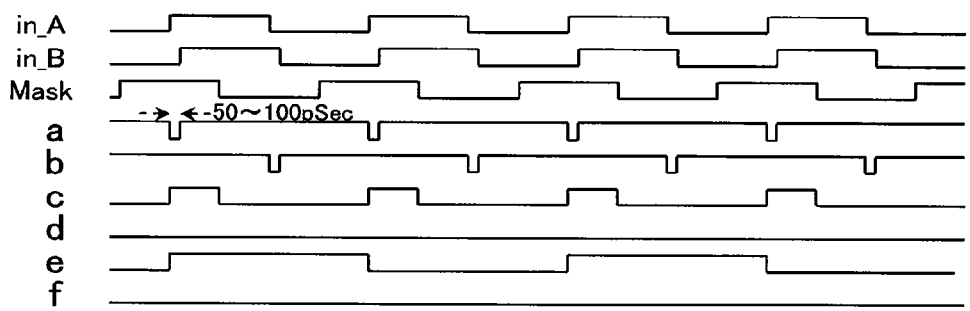
FIG. 4 is a diagram showing waveforms at respective parts lying inside the phase detector, for describing the operation of the phase detector shown in FIG. 3.

FIG. 4 is a diagram showing waveforms at respective parts lying inside the phase detector PD, for describing the operation of the phase detector PD shown in FIG. 3.

As shown in the same drawing, the phase of the output signal of one low-pass filter circuit LPF_Rx_I, which is supplied to one input terminal in_A of the phase detector PD, slightly leads the phase of the output signal of the other low-pass filter circuit LPF_Rx_Q, which is supplied to the other input terminal in_B of the phase detector PD. During 50 through 100 picoseconds, the output a of the NAND circuit NAND1 is brought to a low level "0" and the output b of the NAND circuit NAND2 is brought to a high level "1" in response to the high level "1" of the input terminal in_A and the low level "0" of the input terminal in_B, respectively.

In response to the high level "1" at the output a of the NAND circuit NAND1, the output b of the NAND circuit NAND2 and the mask signal input terminal Mask, the output of the NAND circuit NAND3 is brought to the high level "1", the output of the NAND circuit NAND4 is brought to the low level "0", the output of the NAND circuit NAND5 is brought to the low level "0", and the output of the NAND circuit NAND6 is brought to the high level "1". In doing so, the output c of the inverter Inv3 is brought to the high level "1" in response to the low level "0" of the output of the NAND circuit NAND4, and the output d of the inverter Inv4 is brought to the low level "0" in response to the high level "1" of the output of the NAND circuit NAND6.

Since the flip-flop FF1 latches the low level "0" of an inversion output terminal/Q into a data input D in response to the high level "1" of the output c of the inverter Inv3, a non-inversion output terminal Q is also brought to the low level "0". Since the output d of the inverter Inv4 is maintained at the low level "0", the flip-flop FF2 is maintained in a state of the high level "1" of the non-inversion output terminal Q.

The output e of the inverter Inv5 is brought to the high level "1" in response to the low level "0" of the non-inversion output terminal Q of the flip-flop FF1, and the output f of the inverter Inv6 is brought to the low level "0" in response to the high level "1" of the non-inversion output terminal Q of the flip-flop FF2. The high level "1" of the output e of the inverter Inv5 is transferred to the output terminal out_A via the output buffer OBF1. The low level "0" of the output f of the inverter Inv6 is transferred to the output terminal out_B via the output buffer OBF2.

Thus, the high level "1" is transferred to one output terminal out_A and the other output terminal out_B is maintained at the low level "0" in response to the fact that the phase of the signal supplied to one input terminal in_A of the phase detector PD slightly leads the phase of the signal supplied to the other input terminal in_B of the phase detector PD.

Incidentally, the mask signal of the mask signal input terminal Mask is used to prevent a malfunction of the phase detector PD. Namely, the mask signal is used to prohibit the inversion of a latch comprised of the NAND circuits NAND5 and NAND6 by the low level "0" of the output b of the NAND circuit NAND2, which responds to the high level "1" of a signal at the input terminal in_B, which is delayed in phase during the following 50 through 100 picoseconds.

<<Reception Low-Pass Filter Circuits for Core>>

A description has been made above of the case in which the reception low-pass filter circuits LPF_Rx_I and LPF_Rx_Q for the core of the reception low-pass filter 27 in the receiver system RF Rx of the RF analog LSI 400 actually include the programmable gain amplifiers of three stages and the low-pass filters of four stages, respectively.

Figure 5:
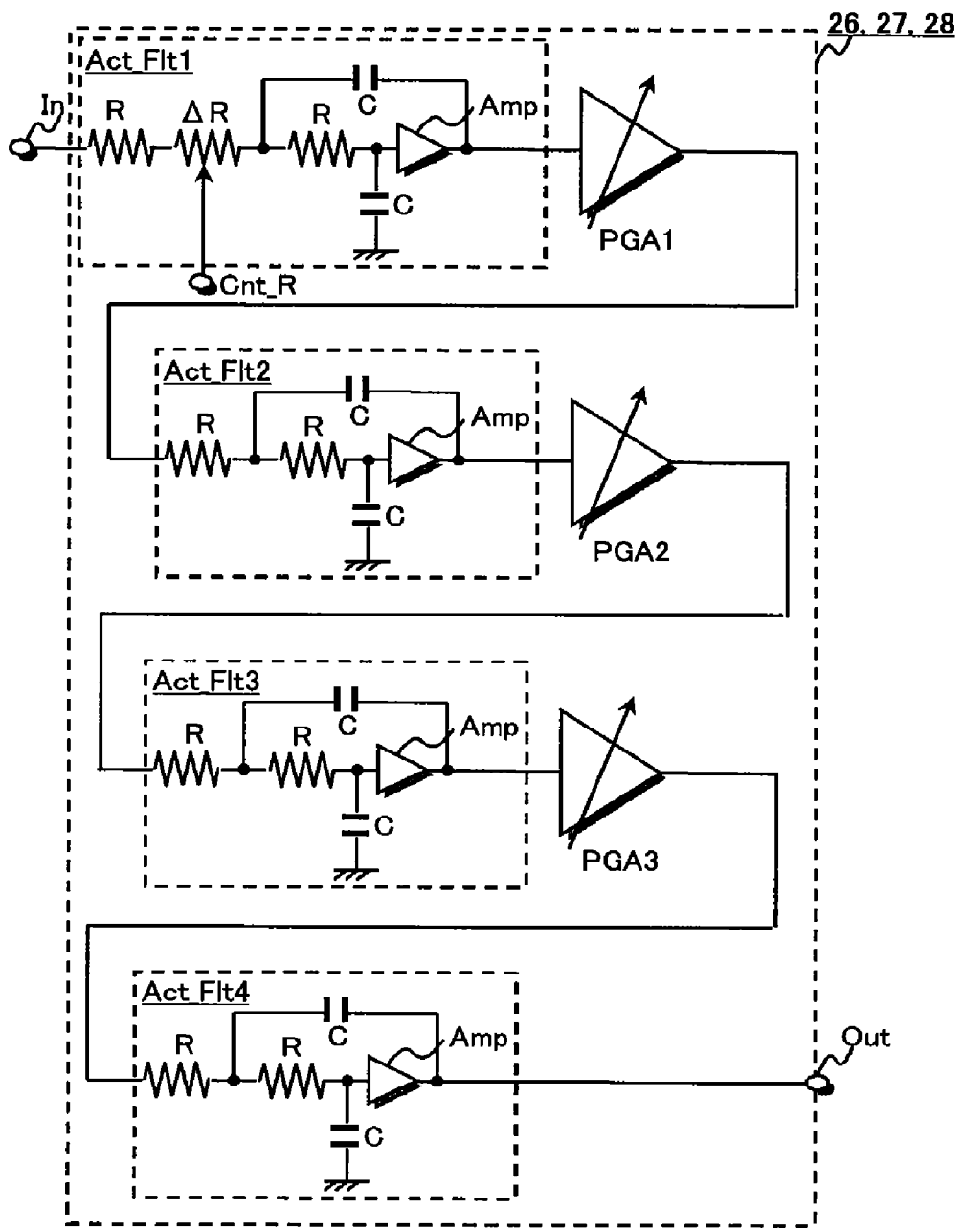
FIG. 5 is a diagram illustrating programmable gain amplifiers of three stages and low-pass filters of four stages that respectively configure reception low-pass filter circuits for the core of the reception low-pass filter.

FIG. 5 is a diagram showing a configuration of programmable gain amplifiers PGA1, PGA2 and PGA3 of three stages and low-pass filters Act_Flt1, Act_Flt2, Act_Flt3 and Act_Flt4 of four stages, which configure the respective low-pass filter circuits LPF_Rx_I and LPF_Rx_Q for the core of the low-pass filter 27. The low-pass filters Act_Flt1, Act_Flt2, Act_Flt3 and Act_Flt4 of four stages are respectively of Sallen-key type active filters each of which basically comprises two resistors R, two capacitors C and a non-inversion amplifier Amp.

In FIG. 5, the resistance value of an additional resistor ΔR at an input terminal In of the first-stage low-pass filter Act_Flt1 is controlled by control data Cnt_R thereby to change the overall characteristics of the low-pass filter circuits for the core of the low-pass filter 27. Incidentally, the control data Cnt_R is of calibration control data supplied from each of the control registers Reg_Rx_I and Reg_Rx_Q of the low-pass filter 27. Although only the characteristic of the first-stage low-pass filter Act_Flt1 is changed, another method can also be adopted. Namely, similar advantageous effects can be obtained even though the characteristic of the second-stage low-pass filter Act_Flt2 and the characteristic of the three-stage low-pass filter Act_Flt3 are changed. Although the characteristics of a plurality of stages are changed, this is also similar to the above. Likewise, the capacitance value of one of the two capacitors C can also be changed.

Figure 6:
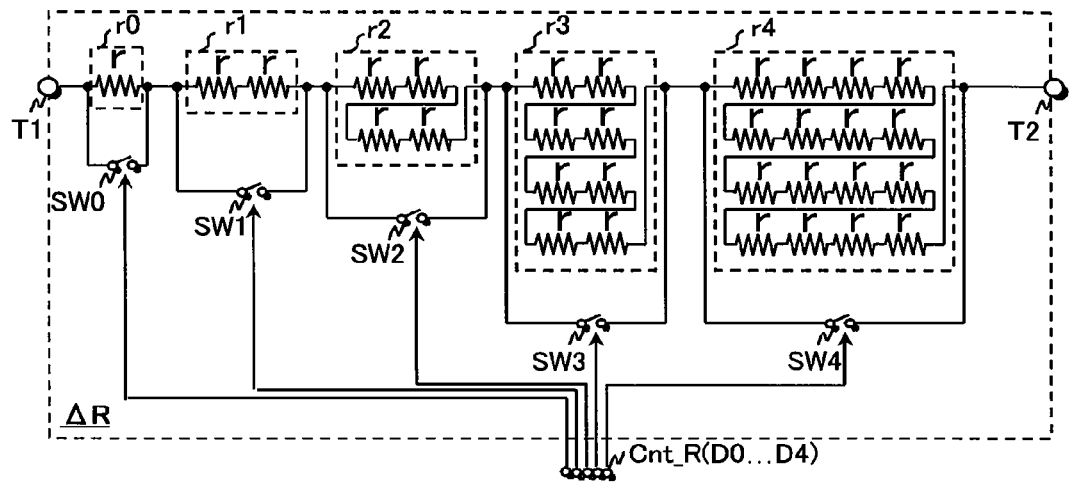
FIG. 6 is a diagram showing a specific manner in which the resistance value of an additional resistor at an input terminal of the first-stage low-pass filter shown in FIG. 5 is controlled by control data.

FIG. 6 is a diagram showing a specific manner in which the resistance value of the additional resistor ΔR at the input terminal In of the first-stage low-pass filter Act_Flt1 shown in FIG. 5 is controlled by the control data Cnt_R. The additional resistor ΔR of the input terminal In comprises five resistance groups r0, r1, r2, r3 and r4 and five switches SW0, SW1, SW2, SW3 and SW4.

The resistance group r0 includes one resistor r, the resistance group r1 includes two resistors r coupled in series, and the resistance group r2 includes four resistors r coupled in series. The resistance group r3 includes eight resistors r coupled in series and the resistance group r4 includes sixteen resistors r coupled in series.

The switch SW0 is coupled across the resistance group r0, the switch SW1 is coupled across the resistance group r1, and the switch SW2 is coupled across the resistance group r2. The switch SW3 is coupled across the resistance group r3 and the switch SW4 is coupled across the resistance group r4.

The five switches SW0, SW1, SW2, SW3 and SW4 are respectively controlled by data D0, D1, D2, D3 and D4 of five bits in the control data Cnt_R.

Assuming that the five switches SW0, SW1, SW2, SW3 and SW4 are respectively set to an off state by a high level "1" of the data D0, D1, D2, D3 and D4 of five bits in the control data Cnt_R, step changes in bit patterns of the data D0, D1, D2, D3 and D4 and changes in the resistance value of the additional resistor ΔR are as follows:

| Step No. | D0 | D1 | D2 | D3 | D4 | ΔR |
|---|---|---|---|---|---|---|
| 0 | "0" | "0" | "0" | "0" | "0" | 0 |
| 1 | "1" | "0" | "0" | "0" | "0" | r |
| 2 | "0" | "1" | "0" | "0" | "0" | 2r |
| 3 | "1" | "1" | "0" | "0" | "0" | 3r |
| 4 | "0" | "0" | "1" | "0" | "0" | 4r |
| 5 | "1" | "0" | "1" | "0" | "0" | 5r |
| ... | ... | ... | ... | ... | ... | ... |
| 29 | "0" | "0" | "1" | "1" | "1" | 29r |
| 30 | "0" | "1" | "1" | "1" | "1" | 30r |
| 31 | "1" | "1" | "1" | "1" | "1" | 31r |

Thus, if the bit patterns of the data D0, D1, D2, D3 and D4 of five bits in the control data Cnt_R of the corresponding calibration control register of the phase-advanced low-pass filter are changed in the direction from a step 0 to a step 31, then the time constant of the phase-advanced low-pass filter can be increased. This control method is made appropriate to low power consumption.

If the bit patterns of the data D0, D1, D2, D3 and D4 of five bits in the control data Cnt_R of the corresponding calibration control register of the phase-delayed low-pass filter are changed in the direction from the step 31 to the step 0 in reverse, then the time constant of the phase-delayed low-pass filter can be decreased. This control method is made appropriate to a reduction in noise.

<<Reception Low-Pass Filter Having Another Configuration>>

Figure 7:
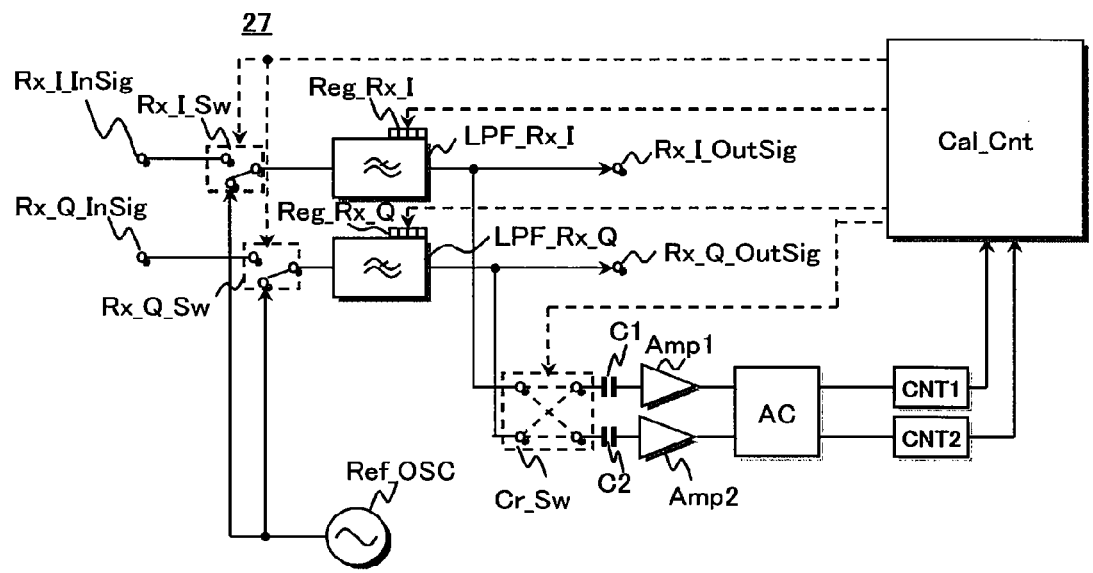
FIG. 7 is a diagram illustrating another configuration of the reception low-pass filter having the calibration function in the receiver system of the RF analog integrated circuit shown in FIG. 1.

FIG. 7 is a diagram illustrating another configuration of the reception low-pass filter 27 having the calibration function in the receiver system RF Rx of the RF analog LSI 400 shown in FIG. 1.

The reception low-pass filter 27 shown in FIG. 7 is different from the low-pass filter 27 shown in FIG. 2 in that the limiter amplifiers Lmt1 and Lmt2 shown in FIG. 2 are respectively substituted with amplifiers Amp1 and Amp2 in FIG. 7 and the phase detector AD shown in FIG. 2 is replaced with an amplitude comparator AC in FIG. 7. Other changes are not performed. Even in the case of the present replacement, however, the amplitude comparator AC in the low-pass filter 27 shown in FIG. 7 detects the relationship of phase between both input signals supplied from the outputs of the amplifiers Amp1 and Amp2 to both input terminals of the amplitude comparator AC. A calibration controller Cal_Cnt changes a control code for either one of control registers Reg_Rx_I and Reg_Rx_Q in response to the output signal of the amplitude comparator AC. Thus, the amplitude comparator AC and the calibration controller Cal_Cnt are used to make it possible to calibrate a relative mismatch between the overall filter characteristics of both low-pass filter circuits LPF_Rx_I and LPF_Rx_Q of the low-pass filter 27.

<<Calibration of Transmission Low-Pass Filter for Suppressing Aliasing Noise of I and Q Analog Transmission Baseband Signals by Transmission D/A Converter>>

Analog transmission baseband signals Tx_I and Tx_Q in which aliasing noise of the transmission D/A converter Tx_D/A is suppressed by the low-pass filter 32 of the RF analog LSI 400, are supplied to one input terminals of the two balanced mixers lying inside the transmission mixer 33. The other input terminals of the two balanced mixers lying inside the transmission mixer 33 are supplied with two transmission local signals of a frequency of about 5 GHz, having a phase difference of approximately 90°, which have been formed by the ΣΔ fractional PLL frequency synthesizer 30. Thus, two transmission signals up-converted to an RF transmission frequency of about 5 GHz are formed from the outputs of the two balanced mixers lying inside the transmission mixer 33. As a result, a vector-synthesized RF transmission signal is generated from the output of an adder coupled to the outputs of the two balanced mixers lying inside the transmission mixer 33 and supplied to the input of the driver amplifier 35.

A transmission characteristic is degraded due to the relative mismatch of the low-pass filter 32, which suppresses the aliasing noise of the transmission D/A converter Tx_D/A, thus resulting in the interference with signal transmission at high throughput.

Thus, there is a need to perform calibration for calibrating the relative mismatch between both filter characteristics of the low-pass filter 32 supplied with the analog transmission baseband signals Tx_I and Tx_Q by the transmitter system RF Tx of the RF analog LSI 400 shown in FIG. 1. The transmitter system RF Tx of the RF analog LSI 400 shown in FIG. 1 has a calibration function for calibrating the mismatch between both filter characteristics of the low-pass filter 32.

<<Transmission Low-Pass Filter Having Calibration Function>>

FIG. 8 is a diagram showing a configuration of a low-pass filter 32 having a calibration function for calibrating a relative mismatch between a pair of filter characteristics of the low-pass filter 32 supplied with analog transmission baseband signals Tx_I and Tx_Q by the transmitter system RF Tx of the RF analog LSI 400 shown in FIG. 1.

A referential signal generator Ref_Osc, a cross switch Cr_Sw, coupling capacitors C1 and C2, limiter amplifiers Lmt1 and Lmt2, a phase detector PD and counters CNT1 and CNT2 of the transmission low-pass filter 32 shown in FIG. 8 share the use of hardware resources with respect to these circuits of the reception low-pass filter 27 shown in FIG. 2. It is thus possible to cut down the chip exclusively-possessed area of the RF analog LSI 400.

Signal input terminals Tx_I_InSig and Tx_Q_InSig of the transmission low-pass filter 32 shown in FIG. 8 are supplied with their corresponding analog transmission baseband signals Tx_I and Tx_Q converted by the transmission D/A converter Tx_D/A of the baseband processing LSI 500 shown in FIG. 1. One input terminals of switches Tx_I_Sw and Tx_Q_Sw are respectively coupled to the signal input terminals Tx_I_InSig and Tx_Q_InSig of the low-pass filter 32. The other input terminals of the switches Tx_I_Sw and Tx_Q_Sw are supplied with a test signal from the referential signal generator Ref_Osc for the purpose of calibration. Input selection control terminals of the switches Tx_I_Sw and Tx_Q_Sw are supplied with an input selection control signal from a calibration controller Cal_Cnt.

Low-pass filter circuits LPF_Tx_I and LPF_Tx_Q of the low-pass filer 32 targeted for calibration are coupled to their corresponding output terminals of the switches Tx_I_Sw and Tx_Q_Sw. Incidentally, although a sine wave is used as the waveform of the test signal generated from the referential signal generator Ref_Osc for the purpose of calibration, a rectangular pulse waveform can be used as another waveform of the test signal.

The low-pass filter circuits LPF_Tx_I and LPF_Tx_Q of the transmission low-pass filter 32 include control registers Reg_Tx_I and Reg_Tx_Q which respectively store control codes for calibration from the calibration controller Cal_Cnt.

Signal output terminals Tx_I_OutSig and Tx_Q_OutSig of the transmission low-pass filter 32 are coupled to the pair of input terminals of the transmission mixer 33 of the transmitter system RF Tx of the RF analog LSI 400 shown in FIG. 1 and coupled to a pair of input terminals of the cross switch Cr_Sw. A pair of output terminals of the cross switch Cr_Sw is coupled to its corresponding input terminals of the waveform shaping limiter amplifiers Lmt1 and Lmt2 via the coupling capacitors C1 and C2. A cross input selection control signal sent from the calibration controller Cal_Cnt is supplied to a cross input selection control terminal of the cross switch Cr_Sw.

The output terminals of the limiter amplifiers Lmt1 and Lmt2 are coupled to their corresponding input terminals of the phase detector PD. The output terminals of the phase detector PD are coupled to their corresponding input terminals of the counters CNT1 and CTN2 for storing an accumulation of a result of phase comparison. The output terminals of the counters CNT1 and CNT2 are coupled to their corresponding input terminals of the calibration controller Cal_Cnt.

Thus, both inputs of the phase detector PD are respectively supplied with the filter characteristics of the low-pass filter circuits LPF_Tx_I and LPF_Tx_Q of the transmission low-pass filter 32. Accordingly, the phase detector PD detects a relative mismatch between the low-pass filter circuits LPF_Tx_I and LPF_Tx_Q of the transmission low-pass filter 32.

<<Basic Transmission Calibration Operation>>

In an ideal state, the filter characteristics of the low-pass filter circuits LPF_Tx_I and LPF_Tx_Q of the transmission low-pass filter 32 become completely identical to each other, and the signals at both inputs of the phase detector PD also become completely identical to each other. In a practical state, however, a relative mismatch occurs between the filter characteristics of the low-pass filter circuits LPF_Tx_I and LPF_Tx_Q of the transmission low pass filter 32 due to variations in the manufacturing process of the RF analog LSI and variations in the dependence of each circuit element on the temperature. The relative mismatch between the low-pass filter circuits LPF_Tx_I and LPF_Tx_Q is reflected on the difference in phase between both input signals of the phase detector PD.

According to the present embodiment of the present invention, the basic transmission calibration for reducing the relative mismatch between the low-pass filter circuits LPF_Tx_I and LPF_Tx_Q of the transmission low-pass filter 32 of the RF analog LSI 400 is executed by the transmission low-pass filter 32 shown in FIG. 8 upon power-on and the start of a communication operation in the wireless LAN system of FIG. 1. Since the details of the basic transmission calibration executed by the transmission low-pass filter 32 shown in FIG. 8 are similar to the basic reception calibration executed by the reception low-pass filter 27 shown in FIG. 2, their explanations will be omitted. As a result, relative variations in the frequency spectra of I and Q transmission analog baseband signals supplied to the pair of input terminals of the transmission mixer 33 of the transmitter system RF Tx in the RF analog LSI 400 are reduced and an improvement in the performance of an RF transmission signal generated from the output of a vector adder of the transmission mixer 33 can be realized.

<<Second Transmission Calibration by Cross Switch>>

A first transmission calibration based on straight coupling of the cross switch Cr_Sw and a second transmission calibration based on cross coupling of the cross switch Cr_Sw are executed. Since the details of the second transmission calibration by the cross switch Cr_Sw are similar to the second reception calibration by the cross switch Cr_Sw, their explanations will be omitted. As a result, the accurate calibration of the low-pass filter circuits LPF_Tx_I and LPF_Tx_Q of the transmission low-pass filter 32, which is unaffected by a phase comparison error of the phase detector PD, is enabled.

Incidentally, the counters CNT1 and CNT2 coupled between the outputs of the phase detector PD and the inputs of the calibration controller Cal_Cnt respectively store an accumulation of a result of phase comparison by the phase detector PD in a manner similar to the reception calibration. Consequently, the calibration controller Cal_Cnt is capable of performing calibration of the transmission low-pass filter circuit 32 from a statistical result of the accumulation of the result of phase comparison.

<<Transmission Calibration Operation for Low Power Consumption>>

In a manner similar to the reception calibration for low power consumption, the phase detector PD and the calibration controller Cal_Cnt increase the time constant of the transmission low-pass filter circuit related to one advanced in phase, of both input signals supplied from the outputs of the limiter amplifiers Lmt1 and Lmt2 to both input terminals of the phase detector PD upon the first and second calibrations.

Assume that when the phase of the output signal of the limiter amplifier Lmt1 is leading that of the output signal of the limiter amplifier Lmt2, the phase detector PD detects it. In doing so, the calibration controller Cal_Cnt controls a control code of the control register Reg_Tx_I in response to the output of the phase detector PD. Thus, the time constant of one low-pass filter circuit LPF_Tx_I in the transmission low-pass filter 32 increases.

In doing so, the phases of both input signals of the phase detector PD coincide with each other. As a result, a relative mismatch between the filter characteristics of the low-pass filter circuits LPF_Tx_I and LPF_Tx_Q of the transmission low-pass filter 32 can be calibrated by the calibration controller Cal_Cnt.

Increasing the resistance value of a resistor of each low-pass filter circuit is made possible by changing coupling forms of a plurality of switches coupled to a plurality of resistors.

In a GmC filter using an operational transconductance amplifier (OTA), an effective resistance (Reff=1/Gm) can be increased by reducing the dc bias current of the operational transconductance amplifier (OTA). In either case, power consumption of the circuit can be cut down by the increase in the resistance value of each resistor in the low-pass filter circuit.

<<Transmission Calibration Operation for Low Noise>>

The phase detector PD and the calibration controller Cal_Cnt decrease the time constant of the low-pass filter circuit related to one delayed in phase, of both input signals supplied to both input terminals of the phase detector PD upon the first and second calibrations in a manner similar to the reception calibration operation for low power consumption.

Decreasing the resistance value of each resistor that configures the low-pass filter circuit enables a decrease in the time constant. Decreasing the resistance value of the resistor of each low-pass filter circuit is made possible by changing coupling forms of a plurality of switches coupled to a plurality of resistors.

In the GmC filter using the operational transconductance amplifier (OTA), the effective resistance (Reff=1/Gm) can be decreased by increasing the dc bias current of the operational transconductance amplifier (OTA). In either case, thermal noise due to the resistor of the circuit can be reduced by the decrease in the resistance value of each resistor in the low-pass filter circuit.

The reception calibration of the reception low-pass filter 27 and the transmission calibration of the transmission low-pass filter 32 are completed in the above-described manner. Thereafter, the wireless LAN system shown in FIG. 1 comprising the RF analog LSI 400 and the baseband processing LSI 500 starts an RF transmitting/receiving operation at a maximum throughput of 100 Mbps based on the IEEE802.11n standard.

While the invention made above by the present inventors has been described specifically on the basis of the embodiments, the present invention is not limited to the embodiments referred to above. It is needless to say that various changes can be made thereto without the scope not departing from the gist thereof.

Figure 9:
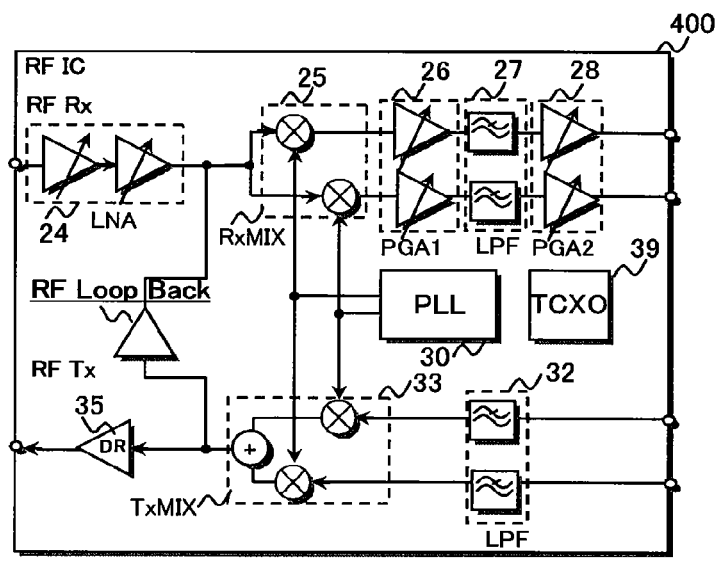
FIG. 9 is a diagram illustrating a configuration of an RF analog integrated circuit in which an RF loop back for reception calibration is coupled between the output of a transmission RF mixer of a transmitter system and the input of a reception mixer of a receiver system.

As a method for supplying the test signal for the reception calibration to the reception low-pass filter 27, for example, it is also possible to couple such an RF loop back as described in the non-patent document 2 between the outputs of the transmission RF mixer and the inputs of the reception RF mixer. FIG. 9 is a diagram illustrating a configuration of an RF analog LSI 400 in which an RF loop back RF Loop Back for reception calibration is coupled between the output of a transmission RF mixer 33 of a transmitter system RF Tx and the input of a reception mixer 25 of a receiver system RF Rx. As a result, the receiver system RF Rx enables calibration including a relative mismatch between two balanced mixers of the reception mixer 25.

Although the RF analog LSI 400 and the baseband processing LSI 500 are respectively formed of the discrete semiconductor chips, they can also be formed as an integrated one chip in which they are combined into one semiconductor chip.

The present invention is not limited to the wireless LAN which performs wireless communications at high throughput, but is applicable even to a cellular phone which transmits high-volume moving picture data.

What is claimed is:

1. A semiconductor integrated circuit that processes an RF reception signal received by an antenna, the semiconductor integrated circuit comprising:
   a frequency synthesizer that generates reception local signals;
   a low noise amplifier that amplifies the RF reception signal;
   a reception mixer supplied with an RF amplified signal corresponding to an output of the low noise amplifier and the reception local signals;
   a reception low-pass filter supplied with downconvert signals generated from the reception mixer, the downconvert signals being a pair of downconvert signals, and the reception low-pass filter including a pair of reception low-pass filters supplied with the downconvert signals;
   a signal supply unit that supplies a calibration test signal to a pair of input terminals of the reception low-pass filters during a calibration operation;
   a phase detection unit that detects a difference in phase between signals at a pair of output terminals of the reception low-pass filters during the calibration operation; and
   a calibration controller that calibrates a relative mismatch between cut-off frequencies of the reception low-pass filters in response to the output of the phase detection unit during the calibration operation.

2. The semiconductor integrated circuit according to claim 1, further comprising:
   a switch unit coupled between the pair of output terminals of the reception low-pass filters and a pair of input terminals of the phase detection unit, and capable of making a change between straight coupling and cross coupling,
   wherein the switch unit enables a calibration operation based on the phase detection unit and the calibration controller in a state of the straight coupling and a calibration operation based on the phase detection unit and the calibration controller at the cross coupling.

3. The semiconductor integrated circuit according to claim 1,
   wherein, during the calibration operation, the phase detection unit and the calibration controller increase a time constant of a corresponding low-pass filter according to an increase in resistance of the corresponding low-pass filter, and
   wherein the corresponding low-pass filter corresponds to one of the output signals of the reception low-pass filters, the output signals being transferred to the pair of input terminals of the phase detection unit, and the one of the output signals being advanced in phase in comparison with the other.

4. The semiconductor integrated circuit according to claim 1,
   wherein, during the calibration operation, the phase detection unit and the calibration controller decrease a time constant of a corresponding low-pass filter according to a decrease in resistance of the corresponding low-pass filter, and
   wherein the corresponding low-pass filter corresponds to one of the output signals of the reception low-pass filters, the output signals being transferred to the pair of input terminals of the phase detection unit, and the one of the output signals being delayed in phase in comparison with the other.

5. The semiconductor integrated circuit according to claim 1,
   wherein the reception mixer of the RF receiver direct-downconverts the RF amplified signal sent from the output of the low noise amplifier into the pair of downconvert signals corresponding to reception baseband signals.

6. The semiconductor integrated circuit according to claim 5,
   wherein the RF receiver processes the RF reception signal having a wireless LAN frequency of approximately 5 GHz, and the RF transmitter generates the RF transmission signal having a wireless LAN frequency of approximately 5 GHz.

7. The semiconductor integrated circuit according to claim 6,
   wherein the RF receiver processes the RF reception signal for a wireless LAN based on the IEEE802.11n standard, and the RF transmitter generates the RF transmission signal for the wireless LAN based on the IEEE802.11n standard.

8. A semiconductor integrated circuit that generates an RF transmission signal to be transmitted from an antenna, the semiconductor integrated circuit comprising:
   a frequency synthesizer that generates transmission local signals;
   a pair of transmission low-pass filters supplied with a pair of transmission analog baseband signals generated by D/A-converting a pair of transmission digital baseband signals formed by a baseband processing processor;
   a pair of transmission mixers supplied with a pair of output signals of the transmission low-pass filters and the transmission local signals;
   an adder supplied with a pair of output signals of the transmission mixers thereby to generate upconvert signals;
   a signal supply unit that supplies a calibration test signal to a pair of input terminals of the transmission low-pass filters during a calibration operation;
   a phase detection unit that detects a difference in phase between signals at a pair of output terminals of the transmission low-pass filters during the calibration operation; and
   a calibration controller that calibrates a relative mismatch between cut-off frequencies of the transmission low-pass filters in response to the output of the phase detection unit during the calibration operation.

9. The semiconductor integrated circuit according to claim 8, further comprising:
   a switch unit coupled between the pair of output terminals of the transmission low-pass filters and a pair of input terminals of the phase detection unit, and capable of making a change between straight coupling and cross coupling, wherein the switch unit enables a calibration operation based on the phase detection unit and the calibration controller in a state of the straight coupling and a calibration operation based on the phase detection unit and the calibration controller at the cross coupling.

10. The semiconductor integrated circuit according to claim 8,
wherein, during the calibration operation, the phase detection unit and the calibration controller increase a time constant of a corresponding low-pass filter according to an increase in resistance of the corresponding low-pass filter, and
wherein the corresponding low-pass filter corresponds to one of the output signals of the transmission low-pass filters, the output signals being transferred to the pair of input terminals of the phase detection unit, and the one of the output signals being advanced in phase in comparison with the other.

11. The semiconductor integrated circuit according to claim 8,
wherein, during the calibration operation, the phase detection unit and the calibration controller decrease a time constant of a corresponding low-pass filter according to a decrease in resistance of the corresponding low-pass filter, and
wherein the corresponding low-pass filter corresponds to one of the output signals of the transmission low-pass filters, the output signals being transferred to the pair of input terminals of the phase detection unit, and the one of the output signals being delayed in phase in comparison with the other.

12. The semiconductor integrated circuit according to claim 8,
wherein the transmission mixers and the adder in the RF transmitter direct-upconvert the pair of output signals of the transmission low-pass filters into the upconvert signals indicative of the RF transmission signal.

13. The semiconductor integrated circuit according to claim 12,
wherein the RF receiver processes the RF reception signal having a wireless LAN frequency of approximately 5 GHz, and the RF transmitter generates the RF transmission signal having a wireless LAN frequency of approximately 5 GHz.

14. The semiconductor integrated circuit according to claim 13,
wherein the RF receiver processes the RF reception signal for a wireless LAN based on the IEEE802.11n standard, and the RF transmitter generates the RF transmission signal for the wireless LAN based on the IEEE802.11n standard.

15. A semiconductor integrated circuit that processes an RF reception signal received by an antenna and generates an RF transmission signal to be transmitted from the antenna, the semiconductor integrated circuit comprising:
a frequency synthesizer that generates reception local signals supplied to the RF receiver and transmission local signals supplied to the RF transmitter;
a low noise amplifier that amplifies the RF reception signal;
a reception mixer supplied with an RF amplified signal corresponding to an output of the low noise amplifier and the reception local signals;
a reception low-pass filter supplied with downconvert signals generated from the reception mixer, the downconvert signals being a pair of downconvert signals, and the reception low-pass filter including a pair of reception low-pass filters supplied with the downconvert signals;
a pair of transmission low-pass filters supplied with a pair of transmission analog baseband signals generated by D/A-converting a pair of transmission digital baseband signals formed by a baseband processing processor;
a pair of transmission mixers supplied with a pair of output signals of the transmission low-pass filters and the transmission local signals;
an adder supplied with a pair of output signals of the transmission mixers thereby to generate upconvert signals;
a reception signal supply unit that supplies a reception calibration test signal to a pair of input terminals of the reception low-pass filters during a reception calibration operation;
a phase detection unit that detects a difference in phase between signals at a pair of output terminals of the reception low-pass filters during the reception calibration operation;
a calibration controller that calibrates a relative mismatch between cut-off frequencies of the reception low-pass filters in response to the output of the phase detection unit during the reception calibration operation; and
a transmission signal supply unit that supplies a transmission calibration test signal to a pair of input terminals of the transmission low-pass filters during a transmission calibration operation,
wherein, during the transmission calibration operation, the transmission signal supply unit supplies the transmission calibration test signal to the pair of input terminals of the transmission low-pass filters,
wherein, during the transmission calibration operation, the phase detection unit detects a difference in phase between signals at a pair of output terminals of the transmission low-pass filters, and
wherein, during the transmission calibration operation, the calibration controller calibrates a relative mismatch between the cut-off frequencies of the transmission low-pass filters in response to the output of the phase detection unit.

16. The semiconductor integrated circuit according to claim 15, further comprising:
a switch unit coupled between the pair of output terminals of the reception low-pass filters and a pair of input terminals of the phase detection unit, and capable of making a change between reception straight coupling and reception cross coupling,
wherein the switch unit enables a reception calibration operation based on the phase detection unit and the calibration controller in a state of the reception straight coupling and a reception calibration operation based on the phase detection unit and the calibration controller at the reception cross coupling,
wherein the switch unit is further coupled between the pair of output terminals of the transmission low-pass filters and the pair of input terminals of the phase detection unit, and capable of making a change between transmission straight coupling and transmission cross coupling, and
wherein the switch unit enables a transmission calibration operation based on the phase detection unit and the calibration controller in a state of the transmission straight coupling and a transmission calibration operation based on the phase detection unit and the calibration controller at the transmission cross coupling.

17. The semiconductor integrated circuit according to claim 15, wherein, during either of the reception calibration operation and the transmission calibration operation, the phase detection unit and the calibration controller increase a time constant of a corresponding low-pass filter according to an increase in resistance of the corresponding low-pass filter, and wherein the corresponding low-pass filter corresponds to one of the output signals of a pair of low-pass filters, the output signals being transferred to the pair of input terminals of the phase detection unit, and the one of the output signals being advanced in phase in comparison with the other.

18. The semiconductor integrated circuit according to claim 15, wherein, during either of the reception calibration operation and the transmission calibration operation, the phase detection unit and the calibration controller decrease a time constant of a corresponding low-pass filter according to a decrease in resistance of the corresponding low-pass filter, and wherein the corresponding low-pass filter corresponds to one of the output signals of the pair of low-pass filters, the output signals being transferred to the pair of input terminals of the phase detection unit, and the one of the output signals being delayed in phase in comparison with the other.

19. The semiconductor integrated circuit according to claim 15, wherein the reception mixer of the RF receiver direct-downconverts the RF amplified signal sent from the output of the low noise amplifier into the pair of downconvert signals corresponding to reception baseband signals, and wherein the transmission mixers and the adder in the RF transmitter direct-upconvert the pair of output signals of the transmission low-pass filters into the upconvert signals indicative of the RF transmission signal.

20. The semiconductor integrated circuit according to claim 19, wherein the RF receiver processes the RF reception signal having a wireless LAN frequency of approximately 5 GHz, and the RF transmitter generates the RF transmission signal having a wireless LAN frequency of approximately 5 GHz, and wherein the RF receiver processes the RF reception signal for a wireless LAN based on the IEEE802.11n standard, and the RF transmitter generates the RF transmission signal for the wireless LAN based on the IEEE802.11n standard.

\* \* \* \* \*